(12) United States Patent  
Garin et al.

(10) Patent No.: US 8,497,036 B2  
(45) Date of Patent: Jul. 30, 2013

(54) BATTERY PARTS HAVING RETAINING AND SEALING FEATURES AND ASSOCIATED METHODS OF MANUFACTURE AND USE

(75) Inventors: Michael A. Garin, Mahotmedi, MN (US); Kurt T. Gifford, Lino Lakes, MN (US)

(73) Assignee: Water Gremlin Company, White Bear Lake, MN (US)

( * ) Notice: Subject to any disclaimer, the term of this patent is extended or adjusted under 35 U.S.C. 154(b) by 376 days.

(21) Appl. No.: 12/771,714

(22) Filed: Apr. 30, 2010

(65) Prior Publication Data

US 2010/0291435 A1 Nov. 18, 2010

Related U.S. Application Data

(60) Provisional application No. 61/174,344, filed on Apr. 30, 2009.

(51) Int. Cl.  
*H01M 2/08* (2006.01)

(52) U.S. Cl.  
USPC ............ 429/182; 429/178; 429/179; 429/181

(58) Field of Classification Search  
USPC .................. 429/178, 179, 181, 182  
See application file for complete search history.

(56) References Cited

U.S. PATENT DOCUMENTS

| | | | |
|---|---|---|---|
| 1,248,768 A | 12/1917 | Willard | |
| 1,326,936 A | 1/1920 | Jean et al. | |
| 1,411,414 A * | 4/1922 | Cook | ............. 429/180 |
| 1,983,618 A | 12/1934 | Lamond | |
| 2,500,556 A | 3/1950 | Mallach | |
| 2,510,100 A | 6/1950 | Goss | |
| 2,599,706 A | 6/1952 | Friedman | |
| 2,901,527 A | 8/1959 | Mocas | |
| 3,096,579 A | 7/1963 | Waller | |
| 3,101,534 A | 8/1963 | Lange | |
| 3,113,892 A | 12/1963 | Albrecht | |

(Continued)

FOREIGN PATENT DOCUMENTS

| | | |
|---|---|---|
| CA | 645083 | 7/1962 |
| CA | 2103759 | 3/1994 |

(Continued)

OTHER PUBLICATIONS

International Search Report and Written Opinion; International Patent Application No. PCT/US2010/033239; Filed: Apr. 4, 2010; Applicant: Water Gremlin Company; Mailed on Sep. 7, 2010.

(Continued)

*Primary Examiner* — Zachary Best  
(74) *Attorney, Agent, or Firm* — Perkins Coie LLP

(57) ABSTRACT

Battery parts having retaining and sealing features and associated assemblies and methods are disclosed herein. In one embodiment, a battery part includes a base portion that is configured to be embedded in battery container material of a corresponding battery container. The battery part and base portion include several torque resisting features and gripping features that resist torsional or twist loads that are applied to the battery part after it has been joined to the battery container. For example, the base portion can include several internal and external torque resisting features and gripping features that are configured to resist twisting or loosening of the battery part with reference to the battery container material, as well as prevent or inhibit fluid leakage from the battery container.

23 Claims, 12 Drawing Sheets

U.S. PATENT DOCUMENTS

| | | |
|---|---|---|
| 3,186,209 A | 6/1965 | Friedman |
| 3,280,613 A | 10/1966 | Schrom |
| 3,292,218 A | 12/1966 | Kozma, Jr. |
| 3,344,848 A | 10/1967 | Hall et al. |
| 3,381,515 A | 5/1968 | Orloff |
| 3,534,802 A | 10/1970 | Carr |
| 3,554,272 A | 1/1971 | Lauth |
| 3,736,642 A | 6/1973 | Miller et al. |
| 3,744,112 A | 7/1973 | Lindenberg et al. |
| 3,793,086 A | 2/1974 | Badger |
| 3,808,663 A | 5/1974 | McLane |
| 3,835,686 A | 9/1974 | Lawson et al. |
| 3,842,646 A | 10/1974 | Kuhn |
| 3,945,097 A | 3/1976 | Daniels, Jr. et al. |
| 3,945,428 A | 3/1976 | Yanagisawa et al. |
| 3,947,936 A | 4/1976 | Wheadon |
| 3,992,759 A | 11/1976 | Farmer |
| 4,049,040 A | 9/1977 | Lynch |
| 4,062,613 A | 12/1977 | Tritenne |
| 4,083,478 A | 4/1978 | McLane |
| 4,100,674 A | 7/1978 | Tiegel |
| 4,146,771 A | 3/1979 | Tiegel |
| 4,160,309 A | 7/1979 | Scholle |
| 4,168,618 A | 9/1979 | Saier et al. |
| 4,177,551 A | 12/1979 | Johnson et al. |
| 4,212,934 A | 7/1980 | Salamon et al. |
| 4,266,597 A | 5/1981 | Eberle |
| 4,284,122 A | 8/1981 | Oxenreider et al. |
| 4,291,568 A | 9/1981 | Stifano, Jr. |
| 4,352,283 A | 10/1982 | Bailey |
| 4,362,043 A | 12/1982 | Hanson |
| 4,377,197 A | 3/1983 | Oxenreider et al. |
| 4,394,059 A | 7/1983 | Reynolds |
| 4,406,146 A | 9/1983 | Suzuki |
| 4,416,141 A | 11/1983 | Nippert |
| 4,422,236 A | 12/1983 | Ware, Jr. et al. |
| 4,423,617 A | 1/1984 | Nippert |
| 4,430,396 A | 2/1984 | Hayes, Jr. |
| 4,495,260 A | 1/1985 | Hardigg et al. |
| 4,497,359 A | 2/1985 | Suzuki et al. |
| 4,505,307 A | 3/1985 | Uchida |
| 4,574,005 A | 3/1986 | Cobbs, Jr. et al. |
| 4,580,431 A | 4/1986 | Oku et al. |
| 4,592,405 A | 6/1986 | Allen |
| 4,610,581 A | 9/1986 | Heinlein |
| 4,614,630 A | 9/1986 | Pluim, Jr. |
| 4,662,205 A | 5/1987 | Ratte |
| 4,683,647 A | 8/1987 | Brecht et al. |
| 4,744,540 A | 5/1988 | Salamon et al. |
| 4,753,283 A | 6/1988 | Nakano |
| 4,775,604 A | 10/1988 | Dougherty et al. |
| 4,776,197 A | 10/1988 | Scott et al. |
| 4,779,443 A | 10/1988 | Hoshi |
| 4,779,665 A | 10/1988 | Ouimet |
| 4,852,634 A | 8/1989 | Kawai et al. |
| 4,859,547 A | 8/1989 | Adams et al. |
| 4,874,032 A | 10/1989 | Hatamura |
| 4,879,191 A | 11/1989 | Sindorf |
| 4,938,276 A | 7/1990 | Noguchi et al. |
| 4,945,749 A | 8/1990 | Walker et al. |
| 4,967,827 A | 11/1990 | Campbell |
| 5,048,590 A | 9/1991 | Carter |
| 5,072,772 A | 12/1991 | Haehne |
| 5,074,352 A | 12/1991 | Suzuki |
| 5,077,892 A | 1/1992 | Nugent |
| 5,079,967 A | 1/1992 | LaCava |
| 5,108,668 A | 4/1992 | Kallup |
| 5,125,450 A | 6/1992 | Kidd et al. |
| 5,143,141 A | 9/1992 | Frulla |
| 5,146,974 A | 9/1992 | Mayer et al. |
| 5,170,835 A | 12/1992 | Eberle et al. |
| 5,180,643 A | 1/1993 | Nedbal |
| 5,244,033 A | 9/1993 | Ueno |
| 5,273,845 A | 12/1993 | McHenry et al. |
| 5,290,646 A | 3/1994 | Asao et al. |
| 5,296,317 A * | 3/1994 | Ratte et al. ............ 429/178 |
| 5,316,505 A | 5/1994 | Kipp |
| 5,326,655 A | 7/1994 | Mix et al. |
| 5,343,927 A | 9/1994 | Ivansson |
| 5,349,840 A | 9/1994 | Ratte et al. |
| 5,373,720 A | 12/1994 | Ratte et al. |
| 5,415,219 A | 5/1995 | Wiedenmann et al. |
| 5,422,202 A | 6/1995 | Spiegelberg et al. |
| 5,445,907 A | 8/1995 | Ito et al. |
| 5,458,032 A | 10/1995 | Spiegelberg |
| 5,499,449 A | 3/1996 | Carter et al. |
| 5,511,605 A | 4/1996 | Iwamoto |
| 5,580,685 A | 12/1996 | Schenk |
| 5,584,730 A | 12/1996 | Tabata et al. |
| 5,595,511 A | 1/1997 | Okada et al. |
| 5,606,887 A | 3/1997 | Spiegelberg et al. |
| 5,623,984 A | 4/1997 | Nozaki et al. |
| 5,632,173 A | 5/1997 | Spiegelberg et al. |
| 5,655,400 A | 8/1997 | Spiegelberg et al. |
| 5,660,946 A | 8/1997 | Kump et al. |
| 5,663,015 A | 9/1997 | Hooke et al. |
| 5,671,797 A | 9/1997 | Nozaki et al. |
| 5,672,442 A | 9/1997 | Burnett |
| 5,686,202 A | 11/1997 | Hooke et al. |
| 5,704,119 A | 1/1998 | Ratte et al. |
| 5,725,043 A | 3/1998 | Schaefer et al. |
| 5,730,203 A | 3/1998 | Mogensen |
| 5,746,267 A | 5/1998 | Yun et al. |
| 5,752,562 A | 5/1998 | Sparks |
| 5,758,711 A | 6/1998 | Ratte |
| 5,778,962 A | 7/1998 | Garza-Ondarza et al. |
| 5,785,110 A | 7/1998 | Guergov |
| 5,791,183 A * | 8/1998 | Spiegelberg et al. .............. 72/68 |
| 5,814,421 A * | 9/1998 | Spiegelberg et al. ......... 429/178 |
| 5,836,372 A | 11/1998 | Kono |
| 5,862,853 A | 1/1999 | Eliat |
| 5,887,641 A | 3/1999 | Iwamoto et al. |
| 5,908,065 A | 6/1999 | Chadwick et al. |
| 5,924,471 A | 7/1999 | Lund et al. |
| 6,001,506 A | 12/1999 | Timmons et al. |
| 6,030,723 A | 2/2000 | Nagano et al. |
| 6,033,801 A | 3/2000 | Casais |
| 6,082,937 A | 7/2000 | Ratte |
| 6,123,142 A | 9/2000 | Ratte |
| 6,152,785 A | 11/2000 | Haller et al. |
| 6,155,889 A | 12/2000 | Scarla et al. |
| 6,183,905 B1 | 2/2001 | Ling et al. |
| 6,202,733 B1 | 3/2001 | Ratte |
| 6,255,617 B1 | 7/2001 | Farmer et al. |
| 6,258,481 B1 | 7/2001 | Ross et al. |
| 6,267,171 B1 | 7/2001 | Onuki et al. |
| 6,363,996 B1 | 4/2002 | Ratte |
| 6,405,786 B1 | 6/2002 | Ratte |
| 6,499,530 B2 | 12/2002 | Ratte |
| 6,513,570 B2 | 2/2003 | Ratte |
| 6,564,853 B1 | 5/2003 | Ratte |
| 6,598,658 B2 | 7/2003 | Ratte |
| 6,613,163 B1 | 9/2003 | Pfeifenbring et al. |
| 6,644,084 B1 | 11/2003 | Spiegelberg |
| 6,684,935 B2 | 2/2004 | Ratte |
| 6,701,998 B2 | 3/2004 | Ratte |
| 6,803,146 B2 | 10/2004 | Key et al. |
| 6,806,000 B2 | 10/2004 | Misra et al. |
| 6,830,490 B2 | 12/2004 | Murakami et al. |
| 6,864,015 B2 | 3/2005 | Peterson et al. |
| 6,866,087 B2 | 3/2005 | Ratte |
| 6,896,031 B2 | 5/2005 | Ratte |
| 6,902,095 B2 | 6/2005 | Ratte et al. |
| 6,908,640 B2 | 6/2005 | Ratte et al. |
| 6,929,051 B2 | 8/2005 | Peterson et al. |
| 6,982,131 B1 | 1/2006 | Hamada et al. |
| 6,997,234 B2 | 2/2006 | Peterson |
| 7,021,101 B2 | 4/2006 | Spiegelberg |
| 7,070,441 B1 | 7/2006 | Gregory et al. |
| 7,074,516 B2 | 7/2006 | Davidson et al. |
| 7,163,763 B2 | 1/2007 | Spiegelberg et al. |
| 7,163,764 B2 | 1/2007 | Ratte |
| 7,246,650 B2 | 7/2007 | Peterson |
| 7,338,539 B2 | 3/2008 | Ratte et al. |
| 7,390,364 B2 | 6/2008 | Ratte et al. |
| 8,202,328 B2 | 6/2012 | Ratte et al. |
| 2001/0031394 A1 | 10/2001 | Hansen et al. |

| | | | |
|---|---|---|---|
| 2002/0002772 A1 | 1/2002 | Hirano et al. | |
| 2002/0114994 A1 | 8/2002 | Yabuki et al. | |
| 2003/0017391 A1 | 1/2003 | Peterson et al. | |
| 2003/0017392 A1 | 1/2003 | Key et al. | |
| 2003/0207172 A1 | 11/2003 | Misra et al. | |
| 2003/0224248 A1 | 12/2003 | Spiegelberg et al. | |
| 2005/0042509 A1 | 2/2005 | Key et al. | |
| 2005/0084751 A1 | 4/2005 | Ratte | |
| 2005/0147881 A1* | 7/2005 | Ratte et al. | 429/178 |
| 2005/0147882 A1 | 7/2005 | Ratte et al. | |
| 2005/0153202 A1 | 7/2005 | Ratte et al. | |
| 2005/0155737 A1 | 7/2005 | Ratte | |
| 2005/0238955 A1 | 10/2005 | Hooke et al. | |
| 2006/0068279 A1 | 3/2006 | Spiegelberg et al. | |
| 2006/0127693 A1 | 6/2006 | Peslerbe et al. | |
| 2008/0038633 A1 | 2/2008 | Ratte et al. | |
| 2009/0047574 A1* | 2/2009 | Hellmann | 429/121 |
| 2009/0229781 A1 | 9/2009 | Ratte | |
| 2009/0246618 A1 | 10/2009 | Dirks | |
| 2010/0116455 A1 | 5/2010 | Ratte | |
| 2011/0045336 A1 | 2/2011 | Ratte et al. | |

FOREIGN PATENT DOCUMENTS

| | | |
|---|---|---|
| CA | 2459031 | 3/1994 |
| CA | 2558525 | 4/2007 |
| CH | 321596 | 5/1957 |
| CH | 371154 | 8/1963 |
| DE | 523104 | 4/1931 |
| DE | 1146149 | 3/1963 |
| DE | 2645977 | 4/1978 |
| DE | 134330 C | 2/1979 |
| DE | 3132292 A1 | 3/1983 |
| DE | 3230628 | 12/1983 |
| DE | 3401354 | 7/1985 |
| DE | 3502675 | 7/1986 |
| DE | 3942175 | 6/1991 |
| DE | 4127956 | 2/1993 |
| DE | 4241393 | 7/1994 |
| DE | 19635075 A1 | 3/1998 |
| EP | 0040951 | 12/1981 |
| EP | 0117213 A1 | 8/1984 |
| EP | 0244683 | 11/1987 |
| EP | 0261311 | 3/1988 |
| EP | 0284068 A1 | 9/1988 |
| EP | 0319128 | 6/1989 |
| EP | 0344042 A1 | 11/1989 |
| EP | 0448792 | 10/1991 |
| EP | 0559920 | 9/1993 |
| EP | 0590284 | 4/1994 |
| EP | 0601268 | 6/1994 |
| EP | 0633081 | 1/1995 |
| EP | 0809327 | 11/1997 |
| EP | 0878856 | 11/1998 |
| EP | 0941554 | 9/1999 |
| EP | 1291940 | 3/2003 |
| ES | 2097388 T3 | 4/1997 |
| FR | 2504424 | 10/1982 |
| GB | 297904 | 10/1928 |
| GB | 386159 A | 1/1933 |
| GB | 1236495 | 6/1971 |
| GB | 1245255 | 9/1971 |
| GB | 1257963 A | 12/1971 |
| GB | 1352882 | 5/1974 |
| GB | 2141654 | 1/1985 |
| GB | 2315695 | 2/1998 |
| JP | 54144931 | 11/1979 |
| JP | 55057259 | 4/1980 |
| JP | 56159054 | 12/1981 |
| JP | 56165359 | 12/1981 |
| JP | 58209861 | 12/1983 |
| JP | 59029357 | 2/1984 |
| JP | 61008846 | 1/1986 |
| JP | 61096660 | 5/1986 |
| JP | 61189860 | 8/1986 |
| JP | 1124954 | 5/1989 |
| JP | 1239762 | 9/1989 |
| JP | 1243369 | 9/1989 |
| JP | 2155557 | 6/1990 |
| JP | 2234347 | 9/1990 |
| JP | 2247036 A | 10/1990 |
| JP | 3049152 | 3/1991 |
| JP | 3263756 | 11/1991 |
| JP | 4135042 | 5/1992 |
| JP | 4206459 | 7/1992 |
| JP | 4223047 | 8/1992 |
| JP | 5283057 | 10/1993 |
| JP | 5325940 | 12/1993 |
| JP | 6015402 | 1/1994 |
| JP | 6020663 | 1/1994 |
| JP | 6196136 | 7/1994 |
| JP | 6223812 | 8/1994 |
| JP | 7211308 | 8/1995 |
| JP | 7211309 | 8/1995 |
| JP | 7235286 | 9/1995 |
| JP | 8171897 | 7/1996 |
| JP | 8273656 | 10/1996 |
| JP | 9045309 | 2/1997 |
| JP | 9130460 | 5/1997 |
| JP | 9167610 | 6/1997 |
| JP | 9237615 | 9/1997 |
| JP | 9312151 | 12/1997 |
| JP | 9320630 | 12/1997 |
| JP | 10116602 | 5/1998 |
| JP | 10144289 | 5/1998 |
| JP | 8171897 | 7/1998 |
| JP | 10208714 | 8/1998 |
| JP | 11045698 | 2/1999 |
| JP | 11045699 | 2/1999 |
| JP | 11135102 | 5/1999 |
| JP | 11176415 | 7/1999 |
| JP | 2000021367 | 1/2000 |
| JP | 2000164199 | 6/2000 |
| JP | 2001256955 | 9/2001 |
| JP | 2001307714 | 11/2001 |
| JP | 2001006655 | 12/2001 |
| JP | 2002025536 | 1/2002 |
| JP | 2002050327 | 2/2002 |
| JP | 2002175795 | 6/2002 |
| JP | 2002270150 | 9/2002 |
| JP | 2003007281 | 1/2003 |
| JP | 2003242946 | 8/2003 |
| JP | 2003317677 | 11/2003 |
| JP | 2003317698 | 11/2003 |
| JP | 2003346777 | 12/2003 |
| JP | 2003346778 | 12/2003 |
| JP | 2004039401 | 2/2004 |
| JP | 2004228013 | 8/2004 |
| JP | 2004228046 | 8/2004 |
| JP | 2004235050 | 8/2004 |
| JP | 2004281145 | 10/2004 |
| JP | 2005078856 | 3/2005 |
| JP | 2005116243 | 4/2005 |
| JP | 2005116387 | 4/2005 |
| JP | 2005142009 | 6/2005 |
| JP | 2006331784 | 12/2006 |
| JP | 2007157611 A | 6/2007 |
| KR | 3044813 | 6/2003 |
| SU | 688279 A1 | 9/1979 |
| WO | WO-9402272 A1 | 2/1994 |
| WO | WO-9907029 A1 | 2/1999 |
| WO | WO-2005067513 A2 | 7/2005 |
| WO | WO-2005119813 | 12/2005 |
| WO | WO-2008032348 A1 | 3/2008 |
| WO | WO2009142621 | 11/2009 |
| WO | WO2010033239 | 3/2010 |
| WO | WO2010127289 | 11/2010 |

OTHER PUBLICATIONS

U.S. Appl. No. 11/709,365, filed Feb. 22, 2007, Ratte.
U.S. Appl. No. 12/029,447, filed Feb. 11, 2008, Ratte.
U.S. Appl. No. 12/470,363, filed May 21, 2009, Ratte.
U.S. Appl. No. 12/533,413, filed Jul. 31, 2007, Ratte.
Colombian Examination Report; Colombian Patent Application No. 99065069; International Filing Date: Oct. 13, 1999; Applicant: Water Gremlin Company; Mailing Date: Mar. 4, 2009.

European Search Report; European Patent Application No. 03023874.5; Applicant: Water Gremlin Company; Mailing Date: Apr. 27, 2010.
European Search Report; European Patent Application No. 04816050.1; Applicant: Water Gremlin Company; Mailing Date: Mar. 3, 2009.
Examination Report; European Patent Application No. 04816050.1; Applicant: Water Gremlin Company; Mailing Date: Jul. 14, 2009.
Final Office Action, Patent Application No. 11/011,362, Mailed on Aug. 31, 2009, 11 pages.
Final Office Action, Patent Application No. 11/058,625, Mailed on Mar. 6, 2006, 5 pages.
Final Office Action, Patent Application No. 11/058,625, Mailed on Jul. 5, 2006, 6 pages.
Final Office Action, Patent Application No. 11/709,365, Mailed on Nov. 21, 2008, 9 pages.
Heller, Machine translation of EP 0601268—May 1993, EPO, 2 pages.
International Search Report and Written Opinion; International Patent Application No. PCT/US04/44071; Filed: Dec. 21, 2004; Applicant: Water Gremlin Company; Mailed on Dec. 22, 2005.
International Search Report and Written Opinion; International Patent Application No. PCT/US08/64161; Filed: May 19, 2008; Applicant: Ferrari, Paolo; Mailed on Aug. 15, 2008.
Non-Final Office Action, Patent Application No. 11/011,362, Mailed on Dec. 5, 2008, 7 pages.
Non-Final Office Action, Patent Application No. 11/058,625, Mailed on Nov. 2, 2005, 5 pages.
Non-Final Office Action, Patent Application No. 11/058,625, Mailed on Nov. 30, 2006, 4 pages.
Non-Final Office Action, Patent Application No. 11/709,365, Mailed on Oct. 31, 2007, 5 pages.
Non-Final Office Action; Patent Application No. 11/076,559; Mailed on Oct. 17, 2008, 6 pages.
Non-Final Office Action; Patent Application No. 12/470,363; Mailed on Jul. 22, 2009, 10 pages.
European Search Report; European Patent Application No. 10196207; Applicant: Water Gremlin Company; Mailing Date: Feb. 28, 2011.
Gould Drawing No. 8RD5538, "Cold Forged Positive Lead Terminal Bushing For Plastic Covers", Gould Auto. Div., St. Paul, Minn., May 3, 1974.
Gould Drawing No. 8RD5539, "Cold Forged Negative Lead Terminal Bushing For Plastic Covers", Gould Auto. Div., St. Paul, Minn., May 3, 1974.
HPM Corporation. HPM Tech Data—Thixomolding. Feb. 1992, 1 page, place of publication unknown.
HPM, Thixomolding Utilizes Injection Molding . . . Date unknown, 2 page advertisement, place of publication unknown.
International Search Report and Written Opinion; International Patent Application No. PCT/US10/43973; Filed: Jul. 30, 2010; Applicant: Water Gremlin Company; Mailed on Dec. 16, 2010.
International Search Report and Written Opinion; International Patent Application No. PCT/US2011/028388 filed Mar. 14, 2011, Mailing Date: Jul. 26, 2011.
International Search Report and Written Opinion; International Patent Application No. PCT/US2011/028389 filed Mar. 14, 2011, Mailing Date: Aug. 25, 2011.
Lindberg Corporation. Hot Lines. Significant Developments from the Engineered Products Group: Equipment News. Date unknown, Issue 3, 3 pages, place of publication unknown. Cited on U.S. Patent 5,758,711.
Lindberg Corporation. Hot Lines. Mar. 1993, vol. III, Issue 2, pp. 1-2, place of publication unknown. Cited on U.S. Patent 5,758,711.
Lindberg Corporation. Press Release: Thixomolding Processes Establishes Production Benchmarks, 1993, 5 pages, Illnois.
Non-Final Office Action; U.S. Appl. No. 12/533,413; Mailed on Jun. 19, 2012, 10 pages.
Examination Report; European Patent Application No. 10196207.4, Applicant: Water Gremlin Company; Mailing Date: Feb. 22, 2013.
Non-Final Office Action; U.S. Appl. No. 12/533,413; Mailed on Jan. 28, 2013, 13 pages.
Extended European Search Report; Application No. 08755902.7, mailed Nov. 27, 2012, 6 pages.

* cited by examiner

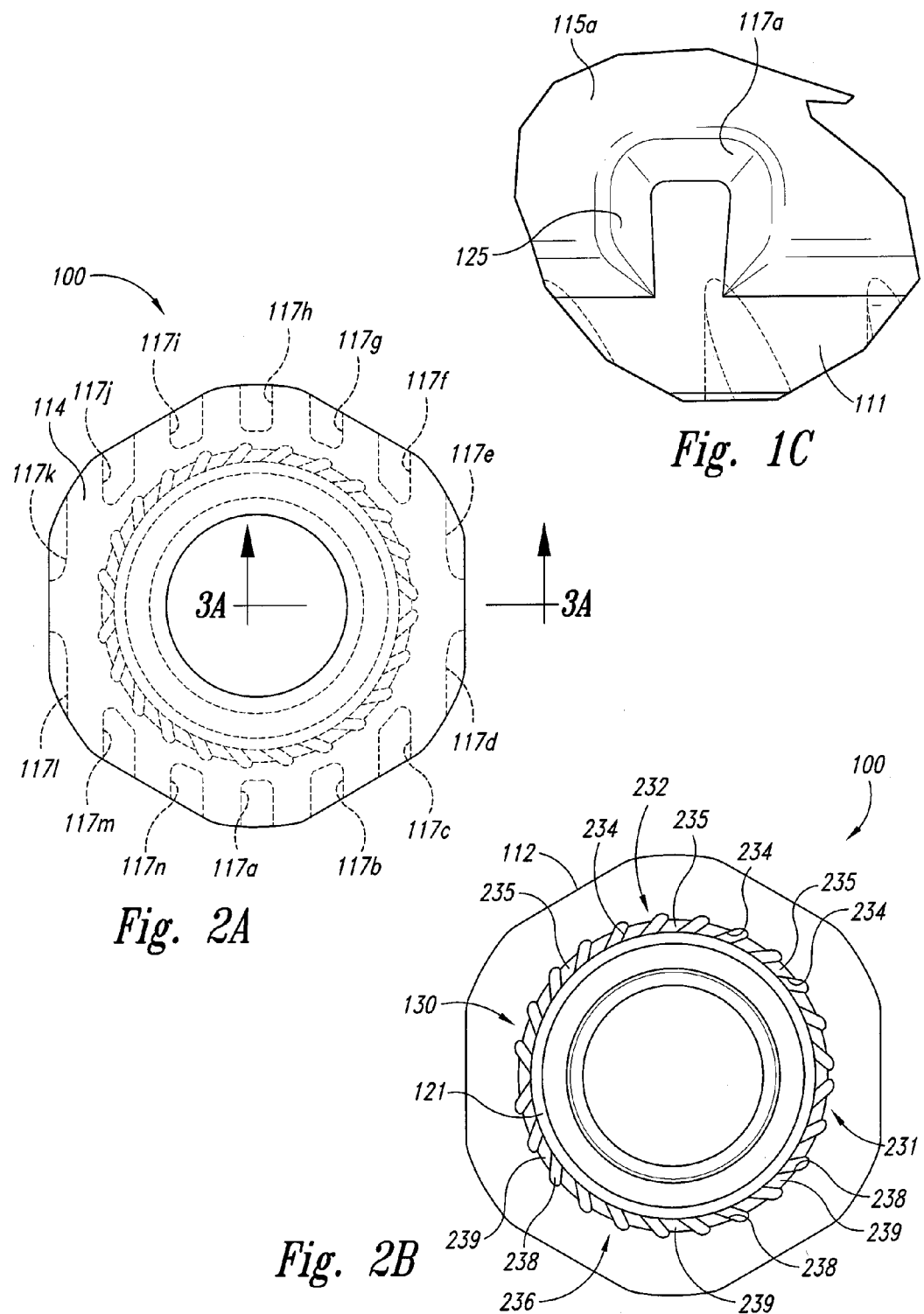

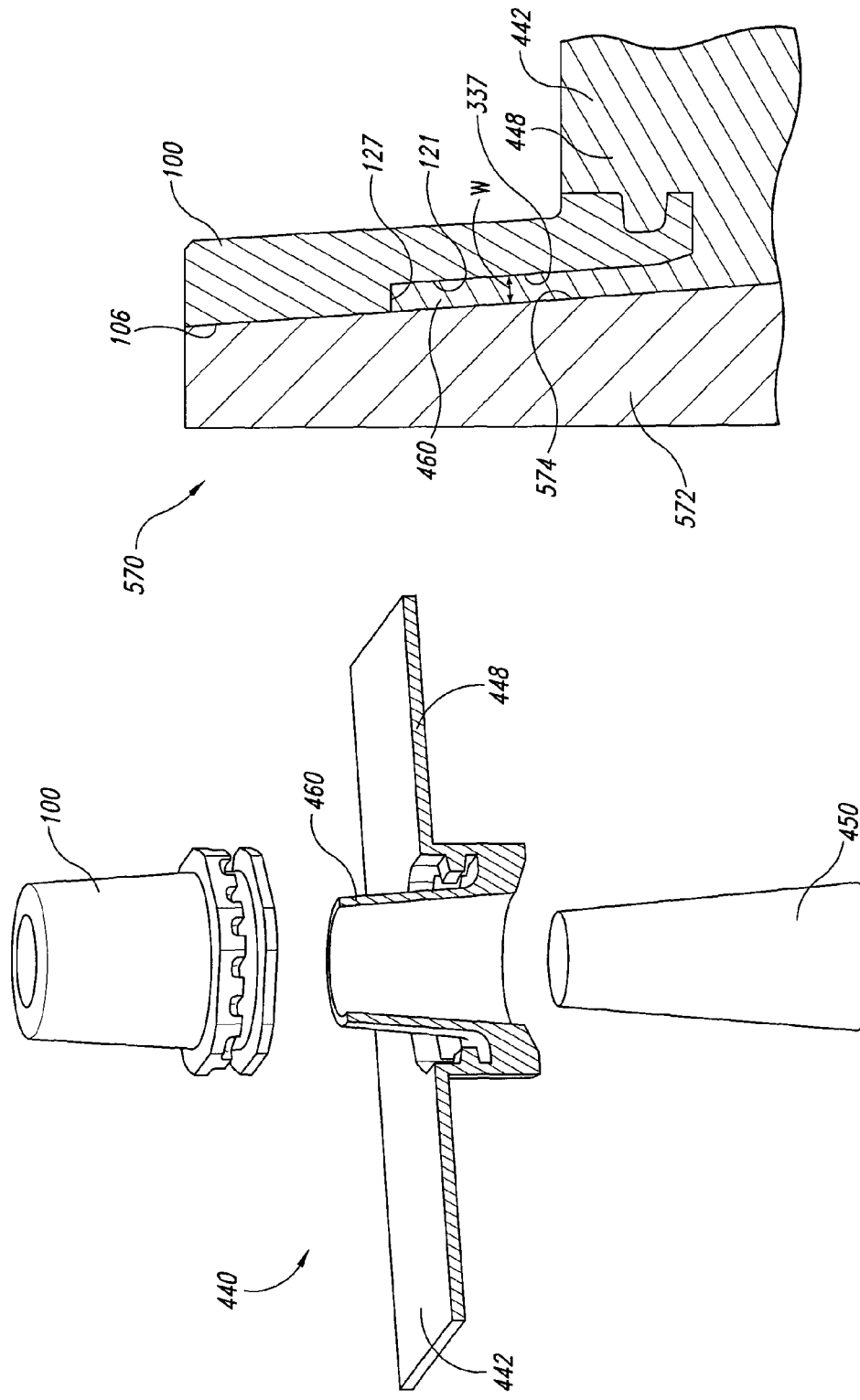

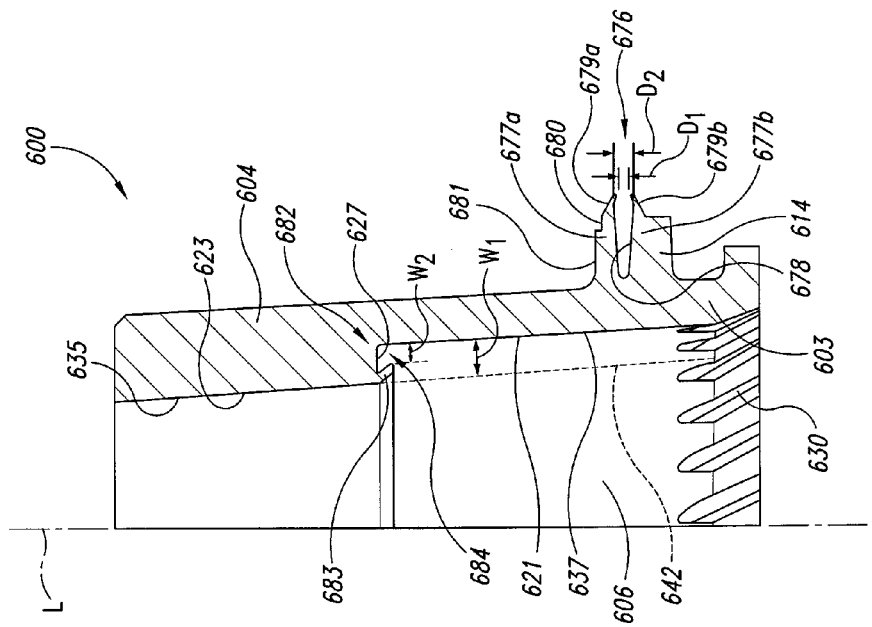
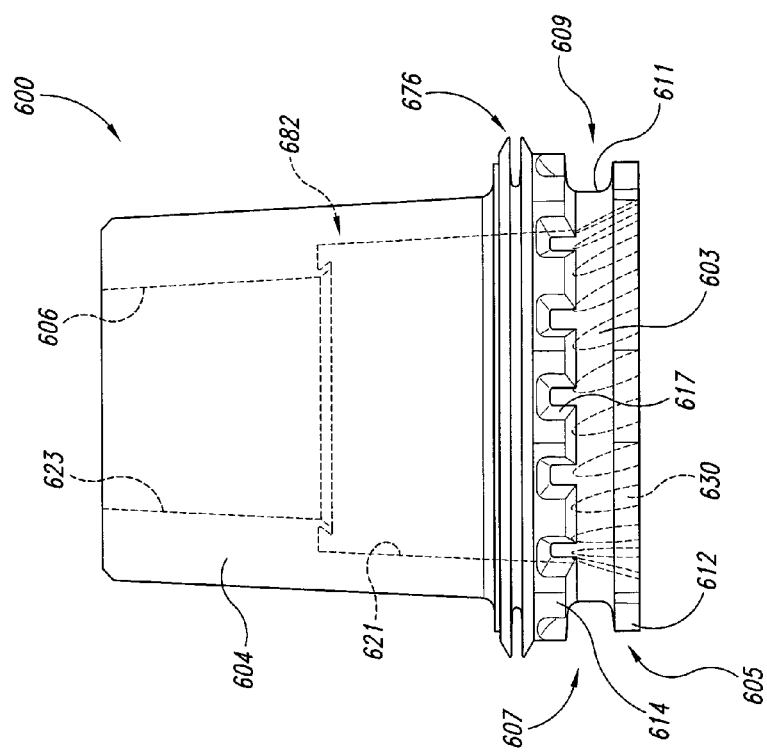

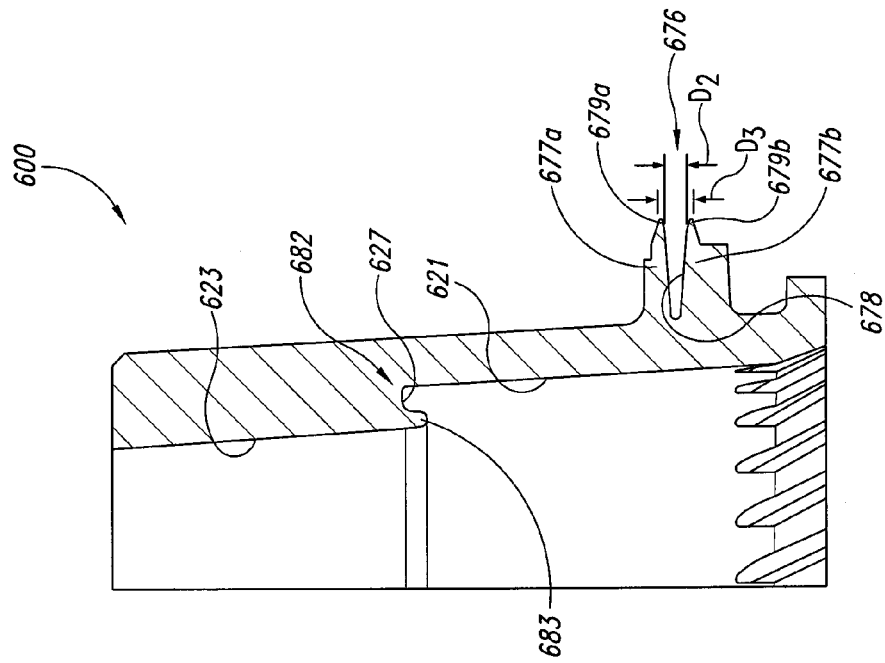
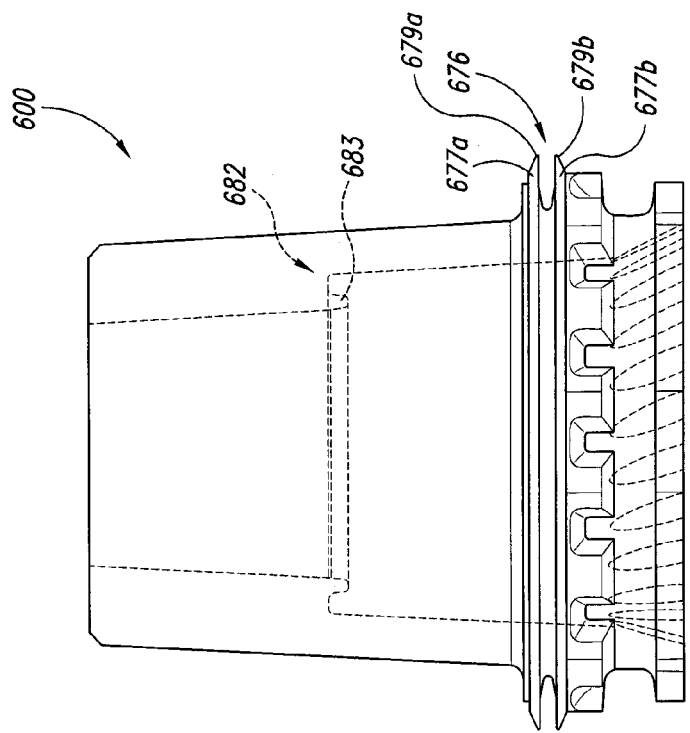
Fig. 6D
Fig. 6C

BATTERY PARTS HAVING RETAINING AND SEALING FEATURES AND ASSOCIATED METHODS OF MANUFACTURE AND USE

CROSS-REFERENCE TO RELATED APPLICATIONS

The present application claims priority to U.S. Provisional Patent Application No. 61/174,344, titled "Battery Parts Having Retaining and Sealing Features and Associated Methods of Manufacture and Use," filed Apr. 30, 2009, which is incorporated herein in its entirety by reference.

TECHNICAL FIELD

The following disclosure relates generally to battery parts and, more particularly, to battery terminals, battery terminal bushings, and the like.

BACKGROUND

Battery terminals are typically cold formed or die cast from lead or lead alloys. In a conventional battery, the terminals protrude from a casing or container which carries electrolyte. The container is typically formed from a moldable thermoplastic resin, such as polypropylene. During manufacture of the container, the resin flows around the base of the terminals so that the resin will secure the terminals in place once it hardens. After a terminal has been secured, a lead anode can be inserted into a central hole in the terminal and melted to fill the hole and form a mechanical and electrical connection to a battery grid positioned within the container.

Battery terminals can include annular acid rings that extend around the base of the terminal to provide an extended interface between the base of the terminal and the adjacent container material. This interface can provide a torturous path or "labyrinth seal" that inhibits or prevents electrolyte from escaping the battery container. Various types of terminal seals, and methods for making such seals are disclosed in U.S. Pat. No. 7,338,539, titled "Die Cast Battery Terminal and Method of Making Same," filed Mar. 4, 2004, and US Patent Application Publication No. 2005/0147882, titled "Battery Part," filed Dec. 3, 2004, each of which are incorporated into the present application in their entireties by reference. Conventional battery terminals may become loose in the container wall if subjected to repeated or excessive twisting or torsional loads. Additionally, shrinkage of the battery container may also contribute to loosening of conventional terminals over time.

BRIEF DESCRIPTION OF THE DRAWINGS

FIG. 1C is an enlarged detail view of a portion of the battery part illustrated in FIGS. 1A and 1B.

FIG. 2A is a top end view and FIG. 2B is a bottom end view of the battery part illustrated in FIGS. 1A and 1B.

FIG. 4C is a fully exploded view of the battery assembly illustrated in FIG. 4A.

FIG. 5 is a partial side cross-sectional view of a battery assembly configured in accordance with another embodiment of the disclosure.

FIG. 6A is a front view of a battery part configured in accordance with yet another embodiment of the disclosure.

FIG. 6B is a partial side cross-sectional view of the battery part of FIG. 6A.

FIG. 6C is a front view of the battery part of FIG. 6A before forming certain features of the battery part illustrated in FIG. 6A.

FIG. 6D is a partial side cross-sectional view of the battery part of FIG. 6C.

DETAILED DESCRIPTION

Figure 1A:
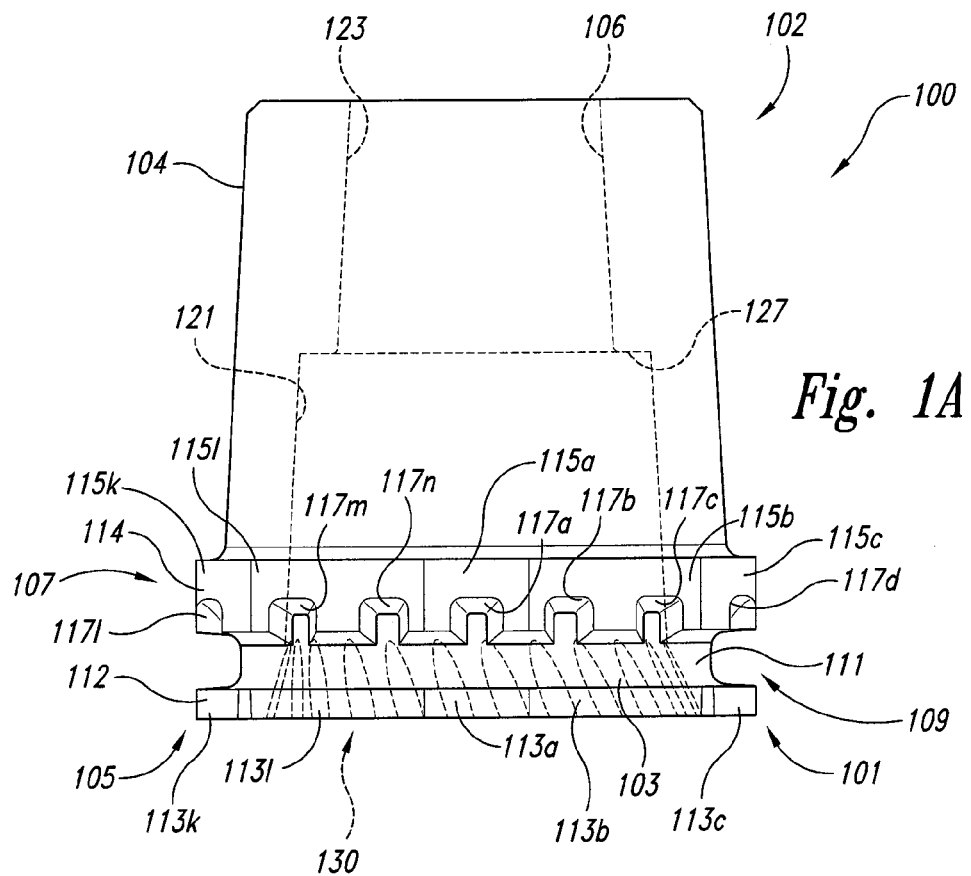
FIG. 1A is a front view and FIG. 1B is a side view of a battery part configured in accordance with an embodiment of the disclosure.

The following disclosure describes various embodiments of battery parts, such as battery terminals or bushings and the like, and associated assemblies and methods of manufacture and use. In one embodiment, a battery terminal configured in accordance with the present disclosure includes a body having a base portion that is configured to be embedded in battery container material when the corresponding battery container is formed. The base portion includes several torque resisting features and gripping features that resist torsional or twist loads that are applied to the battery terminal after it has been joined to the battery container. In one embodiment, for example, a through hole extends through the battery terminal, and the base portion includes a textured or knurled surface at an inner periphery portion of the base portion. The textured surface can include a plurality of alternating grooves and protrusions in a beveled interior surface of the base portion, with the grooves positioned in a helical or angled pattern. In certain embodiments, the grooves can include a first group of grooves angled or extending in a first direction and a second group of grooves angled or extending in a second direction opposite the first direction. In still further embodiments, battery terminals configured in accordance with the present disclosure can include torque resisting features including, for example, flanges, lips, and/or other projections having polygonal shapes, as well as channels, grooves, indentations, serrations, teeth, etc. configured to engage the battery container material.

Certain details are set forth in the following description and in FIGS. 1-8D to provide a thorough understanding of various embodiments of the disclosure. Other details describing well-known structures and systems often associated with battery parts (e.g., lead and/or lead alloy battery parts, moldable battery containers, etc.), and methods for forming such parts (e.g., forming, casting, injection molding, etc.), as well as other battery parts and assemblies, are not set forth in the following disclosure to avoid unnecessarily obscuring the description of the various embodiments of the disclosure.

Many of the details, dimensions, angles and/or other portions shown in the Figures are merely illustrative of particular embodiments of the disclosure. Accordingly, other embodiments can have other details, dimensions, angles and/or portions without departing from the spirit or scope of the present disclosure. In addition, further embodiments of the disclosure may be practiced without several of the details described below, while still other embodiments of the disclosure may be practiced with additional details and/or portions.

In the Figures, identical reference numbers identify identical or at least generally similar elements. To facilitate the discussion of any particular element, the most significant digit or digits of any reference number refers to the Figure in which that element is first introduced. For example, element 110 is first introduced and discussed with reference to FIG. 1.

Figure 1B:
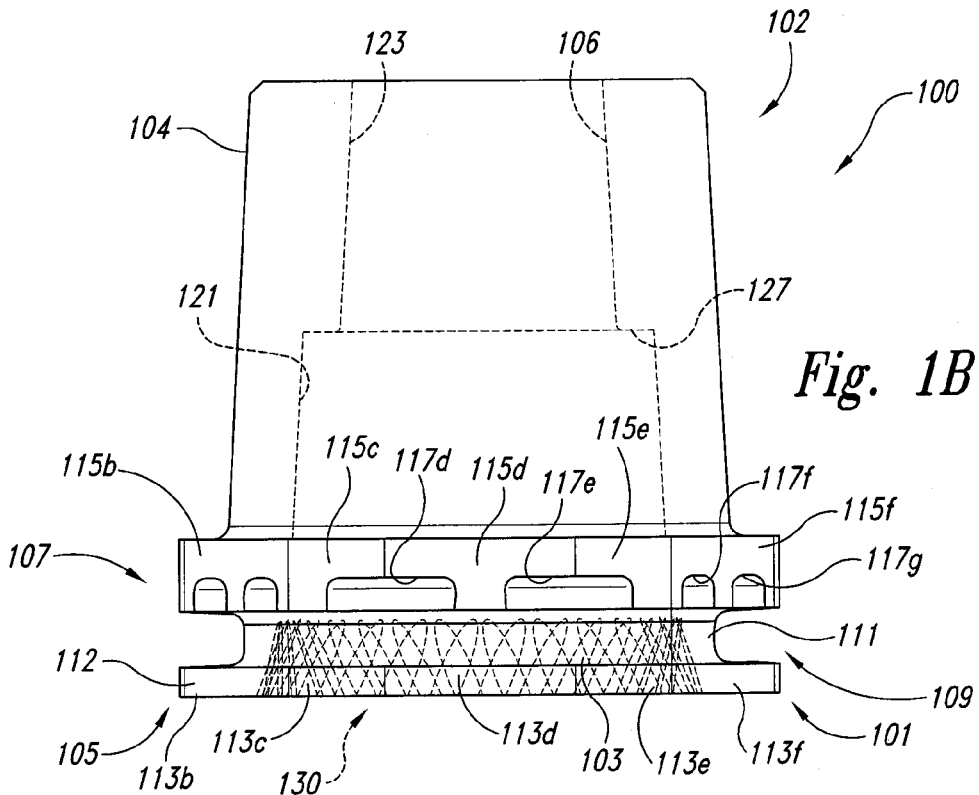

FIG. 1A is a front view and FIG. 1B is a side view of a battery part 100 configured in accordance with an embodiment of the disclosure. Referring to FIGS. 1A and 1B together, in the illustrated embodiment the battery part 100 comprises a battery terminal or terminal bushing. The battery part 100 can be formed from lead, lead alloy, and/or other suitable materials by forming (e.g., cold-forming, cold-forming with a segmented mold, hot-forming, roll-forming, stamping, etc.), casting (e.g., die casting), forging, machining, and/or other suitable methods known in the art. In one aspect of this embodiment, the battery part 100 includes a projecting portion or lug portion 104 that extends from a base portion 103. The battery part 100 can also include a passage or through-hole 106 extending through the battery part 100 from a first end portion 101 to a second end portion 102.

In another aspect of this embodiment, the base portion 103 includes a first torque-resisting feature 105 spaced apart from a second torque-resisting feature 107 by an annular channel 111. In the illustrated embodiment, the first torque-resisting feature 105 includes a first flange 112 and the second torque-resisting feature 107 includes a second flange 114. Each of the first and second flanges 112 and 114 projects from the base portion 103 and extends around the battery part 100. In other embodiments, however, battery parts configured in accordance with the present disclosure can include one or more flanges that extend only partially around the base portion 103 of the battery part 100.

Each of the first and second flanges 112 and 114 is configured to resist torsional or twist loads that are applied to the battery part 100 after it has been joined to a battery container (as described in more detail below). More particularly, in the illustrated embodiment the first flange 112 has a polygonal shape (e.g., a dodecagonal shape) with a plurality of flat, or at least generally flat, side portions 113a-l. Similarly, the second flange 114 also has a polygonal shape (e.g., a dodecagonal shape) with a plurality of flat, or at least generally flat, side portions 115a-l. Accordingly, the first and second flange portions 112 and 114 of the illustrated embodiment have non-circular peripheries that are configured to enhance the ability of the battery part 100 to resist torsional loads during use.

In other embodiments, however, battery parts configured in accordance with the present disclosure can include more or fewer flanges (e.g., torque flanges) or flange portions having other shapes, including those, for example, disclosed in International Patent Application No. PCT/US2008/064161, titled "Battery Parts and Associated Methods of Manufacture and Use," filed May 19, 2008, which is incorporated herein by reference in its entirety. These flange or flange portion shapes can include, for example, polygons (e.g., octagons, hexagons, pentagons, squares, rectangles, triangles, etc.), rectilinear shapes, curvilinear shapes, non-circular shapes, circular or partially-circular shapes, symmetrical shapes, non-symmetrical shapes, irregular shapes, saw-tooth shapes, sun-burst shapes, star patterns, cross-shapes, peripheral teeth, serrations, flat surface portions, angular surface portions, concave surface portions, convex surface portions, etc. Battery parts configured in accordance with the present disclosure can also include other torque-resisting features such as other types of flanges, portions of flanges, lips, protrusions, and/or other projections that extend around, or at least partially around, the battery part 100 with non-circular peripheries. Such torque-resisting features can also include recessed portions or indentations in the battery part 100. In addition, in various embodiments the first flange 112 can have a different shape than the second flange 114. Accordingly, the present disclosure is not limited to dodecagonal-shaped or polygonal-shaped torque resisting flanges, but extends to other flanges, flange portions and other torque resisting features having other shapes. Additionally, other embodiments of the disclosure can include battery terminals, terminal bushings, and other battery parts having configurations that may differ from that illustrated in FIGS. 1A and 1B. For example, battery terminals and other battery parts having lugs and/or other features that may differ from that shown in FIGS. 1A and 1B can also include aspects of the present disclosure disclosed herein.

According to another feature of the embodiment illustrated in FIGS. 1A and 1B, the battery part 100 includes other torque resisting features in addition to the shapes of the first flange 112 and the second flange 114. For example, the second flange 114 includes a serrated or tooth-like edge portion facing the first flange 112. More specifically, the second flange 114 includes a plurality of recesses or grooves 117a-n partially extending through the second flange 114. For example, as shown in FIG. 1C, which is an enlarged detail view of a portion of the battery part 100 of FIG. 1A, the illustrated groove 117a has an upside down U-shaped configuration with a slanted or beveled sidewall 125 extending from the first side portion 115a toward the channel 111. Referring again to FIGS. 1A and 1B, in the illustrated embodiment and as also described below with reference to FIG. 2A, the grooves 117a-n extend through the second flange 114 in the same direction and at least generally parallel to one another. In other embodiments, however, the grooves 117a-n can extend in other directions including, for example, radially inwardly towards the base portion 103. The grooves 117a-n are configured to engage or otherwise grip the battery container material that is molded around the second flange 114 to at least partially prevent the battery part 100 from twisting or otherwise moving in the battery container.

In a further aspect of this embodiment, the base portion 103 includes a sealing portion 109 positioned between the first flange 112 and the second flange 114. In the illustrated embodiment, the sealing portion 109 includes the annular channel 111 that extends around the base portion 103. The sealing portion 109, in combination with the first and second flanges 112 and 114, can interface with the battery container material that is molded around them to form a torturous path-type seal to inhibit or prevent electrolyte or acid from escaping the battery container. In other embodiments, battery parts configured in accordance with the present disclosure can include other types of sealing portions, sealing rings, and/or other sealing features that extend around, or at least partially around the base portion 103.

According to yet another feature of this embodiment, the battery part 100 includes a stepped cavity that forms the through-hole 106 extending through the base and lug portions 103 and 104. More specifically, in the illustrated embodiment, a first cavity 121 extends from the base portion 103 partially into the lug portion 104. The first cavity 121 has a tapered cylindrical or generally frustoconical shape that is axially aligned with a second cavity 123 in the lug portion 104. The second cavity 123 extends from the first cavity 121 through the remainder of the lug portion 104 towards the second end portion 102. The second cavity 123 also has a tapered cylindrical or generally frustoconical shape with a tapering cross-sectional dimension or diameter that is smaller than a corresponding tapering diameter of the first cavity 121. The through-hole 106 includes a stepped portion or shoulder 127 at the interface between the first and second cavities 121 and 123. As explained in detail below, when the battery part 100 is at least partially embedded in the battery container material, the battery container material can flow into the battery part 100 adjacent to a portion of the first cavity 121 up to the shoulder 127.

In the illustrated embodiment, the base portion 103 also includes a plurality of gripping features 130 (shown in broken lines in FIGS. 1A and 1B) forming a textured or knurled surface at the inner periphery portion of the base portion 103. As described in more detail below, the gripping features 130 are configured to grip or otherwise engage the material of the battery container and/or resist torque when the battery part 100 is embedded in a battery container.

FIG. 2A is a top end view and FIG. 2B is a bottom end view of the battery part 100 illustrated in FIGS. 1A-1C. Referring first to FIG. 2A, as shown in the illustrated embodiment, the grooves 117a-n (shown in broken lines) in the second flange 114 extend in the same direction and are at least generally parallel to one another. In this manner, the depth of each groove 117 into the second flange 114 towards the base portion 103 (e.g., in a direction generally perpendicular to a longitudinal axis of the battery part 100) varies around the periphery of the second flange 114. As noted above, however, in other embodiments, the grooves 117 can extend in other directions, including, for example radially outward from the battery part 100. In addition, more or less grooves 117 than those illustrated in FIG. 2A can extend into the second flange 114.

Referring next to FIG. 2B, in the illustrated embodiment the gripping features 130 include a plurality of teeth or protrusions positioned between adjacent grooves, notches, or channels that form a textured or knurled surface 231 around the inner periphery portion of the base portion 103 (e.g., at the inner diameter of the lower portion of the first cavity 121). More specifically, the gripping features 130 include a first group 232 of alternating grooves 234 and protrusions 235 extending around at least approximately 180 degrees of the inner periphery of the base portion 103. The gripping features 130 also include a second group 236 of alternating grooves 238 and protrusions 239 extending around at least approximately the remaining 180 degrees of the inner periphery of the base portion 103. According to one feature of the illustrated embodiment, the grooves 234 in the first group 232 are generally the same as the grooves 238 in the second group 236, with the exception that the grooves 238 in the second group are arranged in a helical pattern that is opposite a helical pattern of the grooves 234 in the first group 232 (i.e., the grooves 234 and 238 of the first and second groups 232 and 236 are angled or slanted in opposite directions). More specifically, each of the grooves 234 and 238 can be formed in the shape of a segment of a helix (e.g., generally similar to the pattern of teeth in a helical gear), with the grooves 234 in the first group 232 at an angle that is opposite or otherwise different from the grooves 238 in the second group 236. In other embodiments, however, all of the grooves 234 and 238 can extend in generally the same direction or pattern (e.g., clockwise, counterclockwise, etc.), or different portions or groups of the grooves 234 and 238 can extend in different directions. Moreover, in still further embodiments the gripping features 130 (e.g., the grooves 234 and 238 and the protrusions 235 and 239) can be straight, rather than arranged in a helical pattern around the inner periphery of the base portion 103. Further aspects of the gripping features 130 are described in detail below with reference to FIGS. 3A and 3B.

Figure 3A:
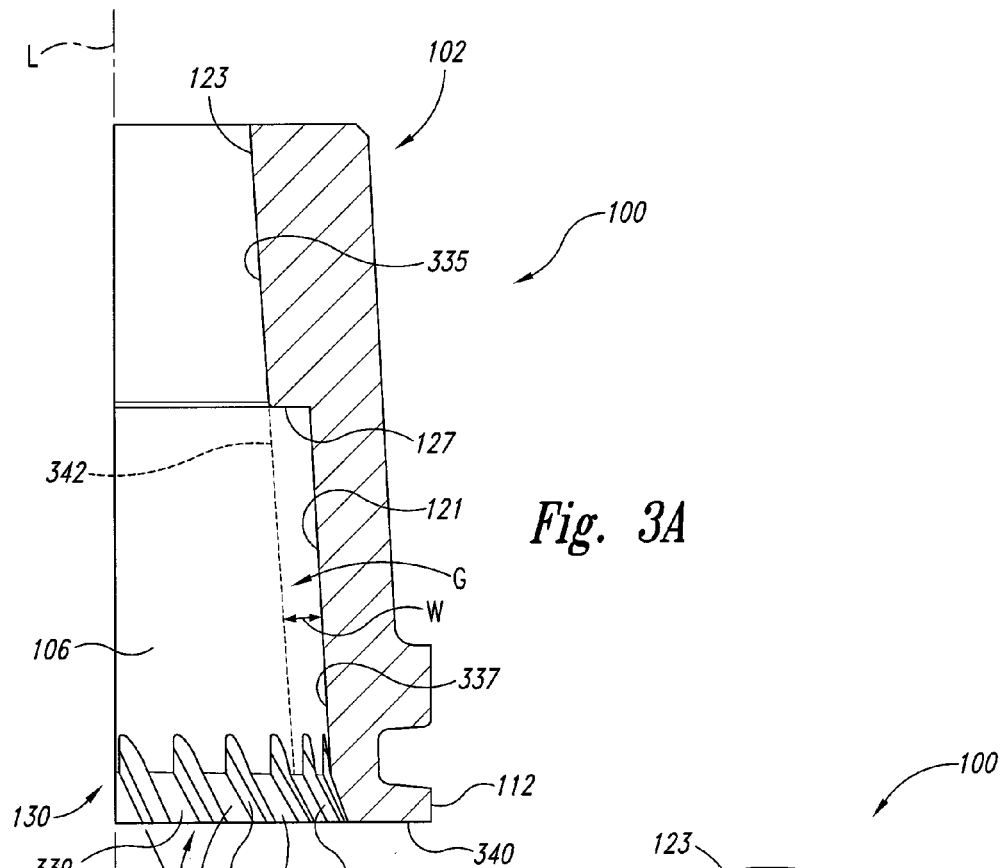
FIG. 3A is a partial side cross-sectional view of the battery part illustrated in FIGS. 1A-2B, taken substantially along line 3A-3A in FIG. 2A.

FIG. 3A is a partial side cross-sectional view of the battery part 100 illustrated in FIGS. 1A-2B, taken substantially along line 3A-3A in FIG. 2A. This view illustrates the gripping features 130 that form the textured (e.g., knurled, serrated, notched, saw-tooth, indented, etc.) surface around an inner periphery 331 of the base portion 103. For example, FIG. 3A illustrates the second group 236 of grooves 238 and protrusions 239 that are formed in an inner surface of the first cavity 121. Moreover, the inner periphery 331 of the base portion 103 further includes an inclined or beveled face 339 extending radially outward from an inner surface 337 of the first cavity 121 towards a bottom surface 340 of the battery part 100. Each groove 238 extends through a portion of the inner surface 337 and the beveled surface 339 and is angled or slanted at an angle B relative to a longitudinal axis L of the battery part 100. In certain embodiments, the angle B can be from about 15 degrees to about 35 degrees, or about 25 degrees. In other embodiments the angle B can have other dimensions.

Although the illustrated gripping features 130 are described herein as alternating channels or grooves 236 and 238 and corresponding protrusions 235 and 239, one skilled in the art will appreciate that the gripping features can include any forms or shapes that collectively form the textured surface at the inner periphery 331 of the base portion 103. For example, the gripping features 130 can include grooves, channels, recesses, holes, indentations, depressions, notches, teeth, serrations, bumps, etc., to create the textured beveled face 339 and/or inner periphery 331. Moreover, the gripping features 130 can be arranged in any pattern, including, for example, non-helical patterns, symmetrical patterns, non-symmetrical patterns, etc.

As also shown in FIG. 3A, the through-hole 106 has the largest cross-sectional dimension or diameter at the bottom surface 340, and the diameter of the through-hole 106 tapers or decreases along the beveled face 339, and further along the inner surface 337 of the first cavity 121 and an inner surface 335 of the second cavity 123 towards the second end portion 102 of the battery part 100. According to another feature of this embodiment, the battery part 100 includes an offset between the sizes of the first cavity 121 and the second cavity 123. As described above, for example, the battery part 100 includes the shoulder 127 at the interface between the first cavity 121 and the second cavity 123. Accordingly, an extension line 342 (shown in broken lines) extending from the inner surface 335 of the second cavity 123 is spaced apart from the inner surface 337 of the first cavity 121 by a width W. As described in detail below, when the battery part 100 is encased in battery container material with a mold part or plug positioned in the battery part 100, the battery container material can flow into a portion of the first cavity 121 to at least partially fill-in the width W between the inner surface 337 of the first cavity 121 and the extension line 342 up to the shoulder 127. Moreover, and as also described below, the gripping features 130 can at least partially facilitate the flow of the battery container material into the first cavity 121, as well as grip or otherwise engage the battery container material to prevent the battery part 100 from twisting or moving in the battery container.

Figure 3B:
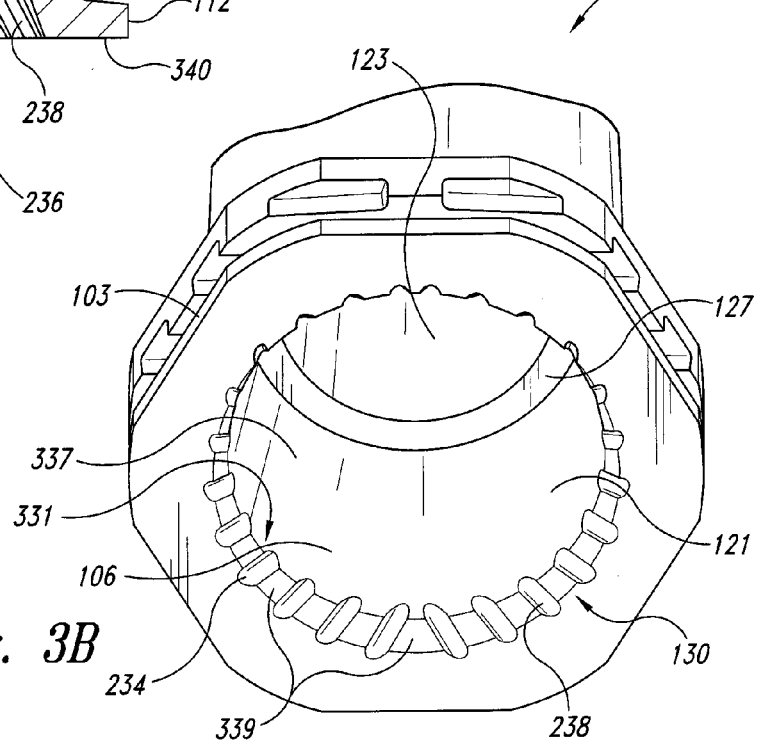
FIG. 3B is a partial isometric bottom end view of the battery part illustrated in FIGS. 1A-3A.

FIG. 3B is a partial isometric end view of the battery part 100 further illustrating several of the features described above. For example, as shown in FIG. 3B, the battery part 100 includes the gripping features 130 at the inner diameter or inner periphery 331 of the base portion 103. More specifically, the grooves 234 and 238, and corresponding protrusions 235 and 239, extend from the bottom surface 340 along the beveled surface 339 to the inner surface 337 of the first cavity 121. Accordingly, the gripping features 130 form the textured or knurled inner periphery 331 of the battery part 100. FIG. 3B also illustrates the shoulder 127 at the interface of the first cavity 121 and the second cavity 123.

Figure 4A:
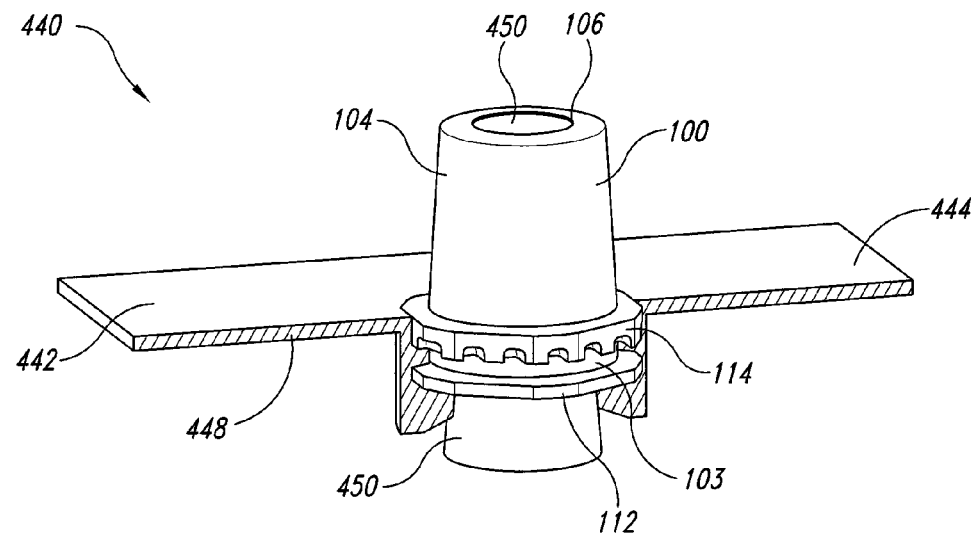
FIG. 4A is a partial cut-away isometric side view of a battery assembly configured in accordance with an embodiment of the disclosure.
Figure 4B:
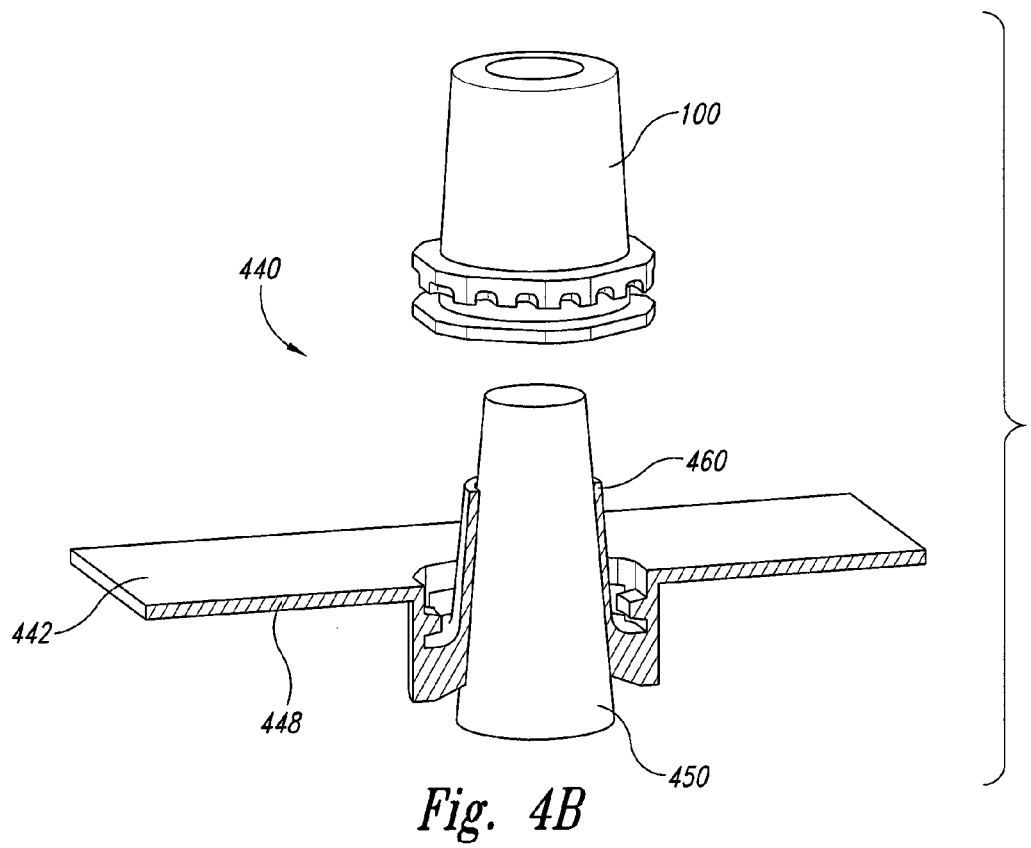
FIG. 4B is a partially exploded view.

FIGS. 4A-4C are a series of views illustrating several features of a battery assembly 440 configured in accordance with an embodiment of the disclosure. Referring first to FIG. 4A, FIG. 4A is a partial cut-away isometric side view of the battery assembly 440 including the battery part 100 (i.e., the battery part 100 described above with reference to FIGS. 1A-3B) fixedly attached to a battery casing or container 442 so that the lug portion 104 is exposed and accessible. The battery container 442 can be formed from a moldable material 448, such as polypropylene, polyethylene, other plastics, thermoplastic resins, and/or other suitable materials known in the art. During manufacture of the battery assembly 440, molten container material 448 can be flowed around the base portion 103 of the battery part 100 so that the first flange 112 is embedded in the container material 448, and the second flange 114 is embedded in the container material 448 adjacent to an outer surface portion 444. The container material 448 also molds around the base portion 103 to create a seal that can prevent or at least inhibit liquid (e.g., electrolyte, acid, water, etc.) from escaping the battery container 442. Moreover, the container material 448 also flows and/or molds around the torque resisting features and characteristics of the base portion 103 described above to prevent the battery part 100 from twisting or moving in the battery container 442 when an external force is applied.

According to another feature of this embodiment, and as noted above, the container material 448 can also flow and mold around a portion of the interior of the battery part 100. More specifically, at this stage in the manufacturing, the battery assembly 400 includes a mold plug or die member 450 received in the through-hole 106 of the battery part 100. The die member 450 substantially fills the second cavity 123 (FIGS. 1A and 1B) and contacts the inner surface 106 of the lug portion 104, however, there is a gap in the first cavity 121 between the die member 450 and the inner surface 337 of first cavity 121 of the battery part 100 (see, e.g., FIG. 3A illustrating the gap G having a width W, and FIG. 5). Accordingly, the container material 448 can flow into the first cavity 121 and at least partially fill the first cavity 121 between the die member 450 and the battery part 100. After the battery part 100 has been secured to the battery container 442 as illustrated in FIG. 4A, the die member 450 is removed from the through-hole 106. The through-hole 106 can then be filled with molten lead or other suitable material to form a mechanical and electrical connection between the battery part 100 and a battery grid (not shown) within the battery container 442.

FIG. 4B is a partially exploded view, and FIG. 4C is a fully exploded view of the battery assembly 400. The battery assembly 400 is shown in the partially exploded and exploded views for purposes of illustrating several features of the engagement or interface of the container material 448 with the battery part 100. For example, referring to FIGS. 4B and 4C together, the container material 448 includes a wall portion 460 that extends into the battery part 100 (and surrounds the die member 450 when the die member is positioned in the battery part 100) adjacent to the inner surface 337 of the first cavity 121 (FIG. 3A). The wall portion 460 is formed when the container material flows into the gap between the inner surface 337 of the first cavity 121 and the die member 450. In certain embodiments, the wall portion 460 has a height that corresponds to the height of the shoulder 127 at the interface between the first and second cavities 121 and 123 of the battery part 100 (FIG. 3A). In other embodiments, the container material may not completely fill the gap between the battery part 100 and the die member 450.

FIG. 5 is a partial side cross-sectional view of a completed battery assembly 570 configured in accordance with another embodiment of the disclosure. In the illustrated embodiment, the battery part 100 is fixedly attached to the moldable material 448 of the battery container 442. The battery assembly 570 also includes a lead anode or conductor 572 that is mechanically and electrically connected to the battery part 100. More specifically, the conductor 572 fills the through-hole 106 and can be connected to a battery grid (not shown) positioned within the battery container 442.

According to one aspect of this embodiment, an exterior surface 574 of the conductor 572 is spaced apart from the inner surface 337 of the first cavity 121 by a gap having a width W. However, as described above with reference to FIGS. 4A-4C, the wall portion 460 of the mold material 448 is positioned adjacent to the inner surface 337 of the first cavity 121 to fill the gap between the conductor 570 and the battery part 100. In certain embodiments and as shown in FIG. 5, the wall portion 460 completely fills the gap and extends to the shoulder 127 of the battery part. In other embodiments, however, the mold material 448 may only partially fill the gap between the conductor 572 and the battery part 100.

One advantage of the embodiments described above with reference to FIGS. 1A-5 is that the gripping features 130 forming the textured surface at the inner periphery portion of the base portion 103 may advantageously reduce the amount of lead required to make the battery part 100. Moreover, the grooves 234 and 238 of the gripping features 130 also advantageously facilitate the flow of the battery container material 448 adjacent to the inner surface 337 of the first cavity 121 when the battery part 100 is embedded in the battery container 442. In addition, the gripping features 130 may also engage the battery container material 448 and at least partially prevent the battery part 100 from twisting (e.g., in a clockwise direction and/or a counter clockwise direction) in the battery container 442 and/or from otherwise loosening or moving in the battery container 442.

FIG. 6A is a front view of a battery part 600 configured in accordance with another embodiment of the disclosure. FIG. 6B is a partial side cross-sectional view of the battery part 600 of FIG. 6A. Referring to FIGS. 6A and 6B together, the battery part 600 includes several features that are at least generally similar in structure and function to the corresponding features of the battery parts described above with reference to FIGS. 1A-5. For example, the battery part 600 illustrated in FIGS. 6A and 6B includes a projecting portion or lug portion 604 extending from a base portion 603, and a through-hole 606 extending longitudinally through the battery part 600. The base portion 603 includes a first torque-resisting feature 605 spaced apart from a second torque-resisting feature 607 by an annular channel 611. The first torque-resisting feature 605 includes a first flange 612 and the second torque-resisting feature 607 includes a second flange 614. The first flange 612 can have a polygonal shape and can include a plurality of flat, or at least generally flat, side portions 615. The second flange 614 can include a plurality of recesses or grooves 617 extending at least partially through the second flange 614. The base portion 603 also includes a plurality of gripping features 630 (shown in broken lines in FIG. 6A) forming a textured or knurled surface at the inner periphery portion of the base portion 603. The gripping features 630, in combination with the first and second torque resisting features 605 and 607, are configured to grip or otherwise engage the material of a battery container when the battery part 600 is embedded in the battery container.

The base portion 603 further includes a first sealing portion 609 between the first flange 612 and the second flange 614. The first sealing portion 609 can include the annular channel 611 extending around the base portion 603. The first sealing portion 609, in combination with the first and second flanges 612 and 614, can form an interface with the battery container material that is molded around them to form a torturous path-type seal to inhibit or prevent electrolyte, acid, and/or other fluids from escaping the battery container.

In one aspect of the illustrated embodiment, the battery part 600 includes a first engaging portion 676 that is also configured to form a seal with the battery container material and/or engage the battery container material to prevent the battery part 600 from moving or loosening in the battery container. More specifically, and as illustrated in detail in FIG. 6B, the second seal portion 676 includes an annular groove 678 extending between gripping projections or sealing members 677 (identified individually as a first gripping projection or sealing member 677a and a second gripping projection or sealing member 677b). In the illustrated embodiment, the sealing members 677 and the groove 678 extend around a periphery of the base portion 603 above the second flange 614. Each of the sealing members 677 includes a flange or annular lip with an edge portion 679 (identified individually as a first edge portion 679a and a second edge portion 679b) extending outwardly from the base portion 603. The sealing members 677 form a bifurcated portion of the second flange 614 with the edge portions 679 extending radially outwardly from the base portion 603. In certain embodiments, and as explained in detail below, each edge portion 679 is at least partially deformed (e.g., crimped) or otherwise deflected or directed towards the opposing edge portion 679. For example, the first engaging portion 676 can include a first dimension $D_1$ between the edge portions 679 of the sealing members 677 that is less than a second dimension $D_2$ of the groove 678, the second dimension $D_2$ spanning across the largest opening or dimension in the groove 678. Due to the deformed or crimped edge portions 679, the inner surfaces of the sealing members 677 facing the groove 678 are at least partially curved and non-planar. The first sealing member 677a also includes a stepped or shoulder portion 680 that is adjacent to a lateral face 681 extending radially away from the lug portion 604.

According to yet another feature of the illustrated embodiment, the battery part 600 includes a second engaging portion 682 at a stepped or shoulder portion 627 of the through-hole 606. More specifically, the through-hole 606 includes a first cavity 621 extending from the base portion 603 partially into the lug portion 604. The first cavity 621 has a tapered cylindrical or generally frustoconical shape that is axially aligned with a second cavity 623 in the lug portion 604. The second cavity 623 extends from the first cavity 621 through the remainder of the lug portion 604. The second cavity 623 also has a tapered cylindrical or generally frustoconical shape with a tapering cross-sectional dimension or diameter that is smaller than a corresponding tapering diameter of the first cavity 621. An extension line 642 (shown in broken lines) extending from an inner surface 635 of the second cavity 623 is spaced apart from an inner surface 637 of the first cavity 121 by a first width $W_1$.

The shoulder portion 627 of the through-hole 606 is located at the interface between the first cavity 621 and the second cavity 623. At the shoulder portion 627, the second engaging portion 682 includes a web, flange, lip, or projection 683 extending downwardly from the inner surface 635 of the second cavity 623 into the first cavity 621. The projection 683 is spaced apart from the inner surface 637 of the first cavity 621 and defines a pocket or recess 684 therebetween. In the illustrated embodiment the projection 683 is deformed (e.g., crimped) or otherwise deflected or directed towards the inner surface 637 of the first cavity 621 such that an end portion of the projection 683 is spaced apart from the inner surface 637 of the first cavity 621 by a second width $W_2$ that is less than the first width $W_1$. As described in detail below, when the battery part 600 is encased in battery container material with a mold part or plug positioned in the cavity 606 of the battery part 600, the battery container material can flow into a portion of the first cavity 621 to at least partially fill the first width $W_1$ between the inner surface 637 of the first cavity 621 and the extension line 642. When the battery part 600 is embedded in the battery container material, the second engaging portion 682, including the projection 683 forming the pocket 684 at the shoulder portion 627, can at least partially engage and/or retain the battery container material to prevent the battery part 600 from twisting or moving in the battery container. The second engaging portion 682 can also prevent a fluid from leaking from the battery container.

FIG. 6C is a front view of the battery part 600 of FIG. 6A, illustrating the battery part 600 before forming or completing certain features of the first engaging portion 676 and the second engaging portion 682. FIG. 6D is a partial side cross-sectional view of the battery part of FIG. 6C. Referring to FIGS. 6C and 6D together, at this stage the edge portions 679 of the corresponding sealing members 677 have not yet been deformed or directed towards one another. More specifically, and as shown in FIG. 6D, a third dimension $D_3$ between the edge portions 679 is greater than the second dimension $D_2$ of the groove 678 before the sealing members 677 are deformed. In addition, at the stage illustrated in FIGS. 6C and 6D, the projection 683 of the second engaging portion 682 has not yet been deformed or directed towards the inner surface of the first cavity 621. Rather, the projection 683 is generally parallel with the inner surface of the second cavity 623. The process of deforming or completing these features of the first and second engaging portions 676 and 682 is described in detail below with reference to FIGS. 9A-9D.

Figure 7:
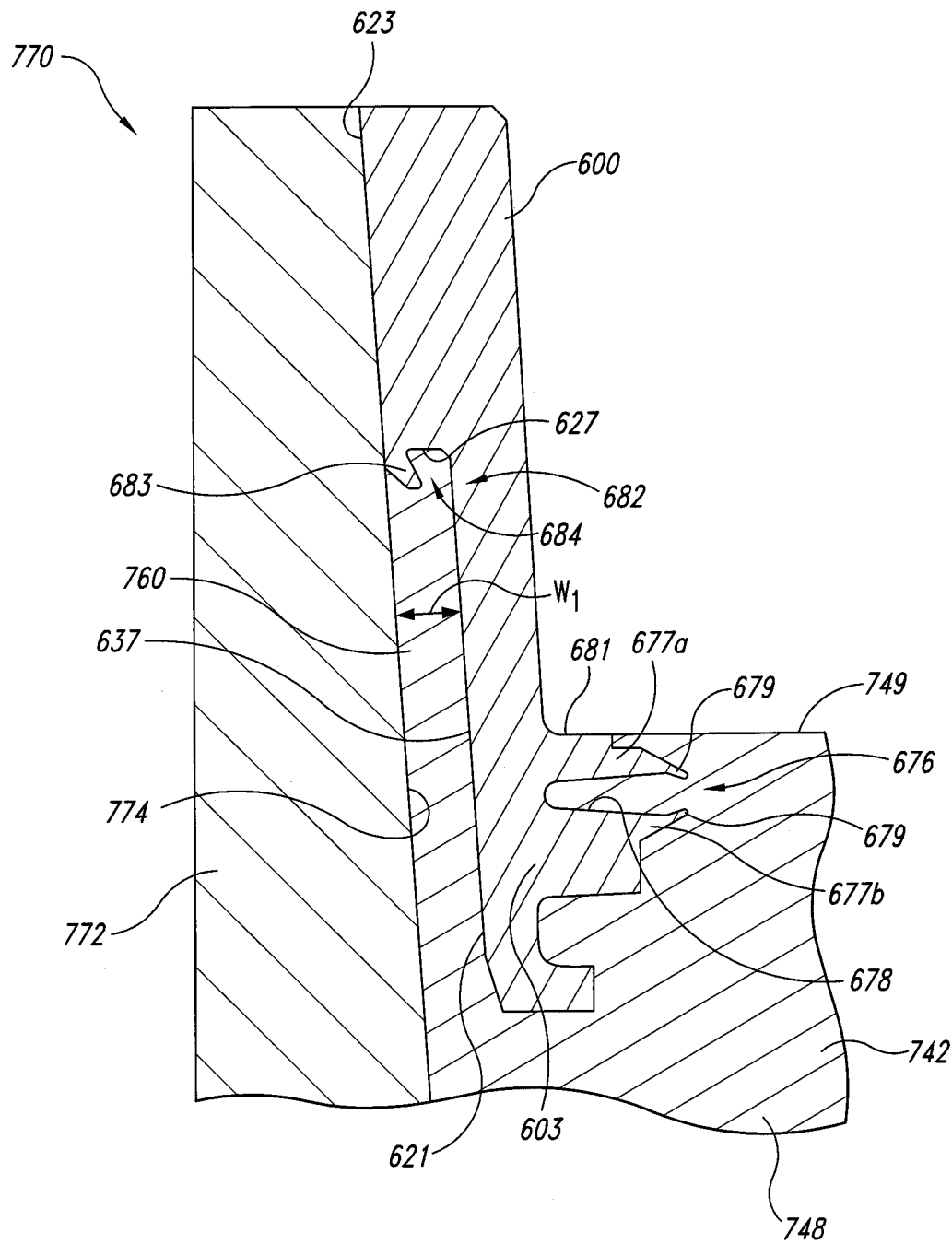
FIG. 7 is a partial side cross-sectional view of a battery assembly configured in accordance with another embodiment of the disclosure.

FIG. 7 is a partial side cross-sectional view of a completed battery assembly 770 configured in accordance with an embodiment of the disclosure. In the illustrated embodiment, the battery assembly 770 includes the battery part 600 described above with reference to FIGS. 6A and 6B, which is fixedly attached to moldable material 748 of a battery container 742. The lateral face 681 of the base portion 603 is at least generally aligned with an exterior surface 749 of the battery container 742. The battery assembly 770 further includes a lead anode or conductor 772 that is mechanically and electrically connected to the battery part 600. For example, the conductor 772 can completely fill the second cavity 623 of the through-hole 606 and can be connected to a battery grid (not shown) positioned within the battery container 742. Moreover, an exterior surface 774 of the conductor 772 is spaced apart from the inner surface 637 of the first cavity 621 by a gap having the first width $W_1$. A wall portion 760 of the mold material 748 is molded adjacent to the inner surface 637 of the first cavity 621 to fill the gap between the conductor 770 and the battery part 600. In the illustrated embodiment, the wall portion 760 extends to the shoulder portion 627 of the battery part 600.

In the illustrated embodiment, the first engaging portion 676 and the second engaging portion 682 engage or otherwise contact the mold material 748 to retain and seal the battery part 600 in the battery container 742. Accordingly, the first engaging portion 676 and the second engaging portion 682 at least partially prevent the battery part 600 from pulling out of the battery container 742 and/or prevent fluid from leaking from the battery container 742 at the interface between the battery container 742 and the battery part 600. More specifically, with reference to the first engaging portion 676, the crimped or angled edge portions 679 of the sealing members 677 retain the mold material 748 in the groove 678 between the sealing members 677. For example, as the mold material 748 solidifies around the base portion 603 of the battery part 600, the sealing members 677 retain the mold material 748 in the groove 678 and at least partially prevent the mold material 748 from shrinking or retracting away from the base portion 603. Similarly, the projection 683 of the second engaging portion 682 also at least partially engages and/or retains the mold material 748 in the recess 684 and adjacent to the inner surface 637 of the first cavity 621 of the battery part 600. The projection 683 accordingly at least partially prevents the mold material 748 from shrinking or retracting out of the pocket 684.

Figure 8A:
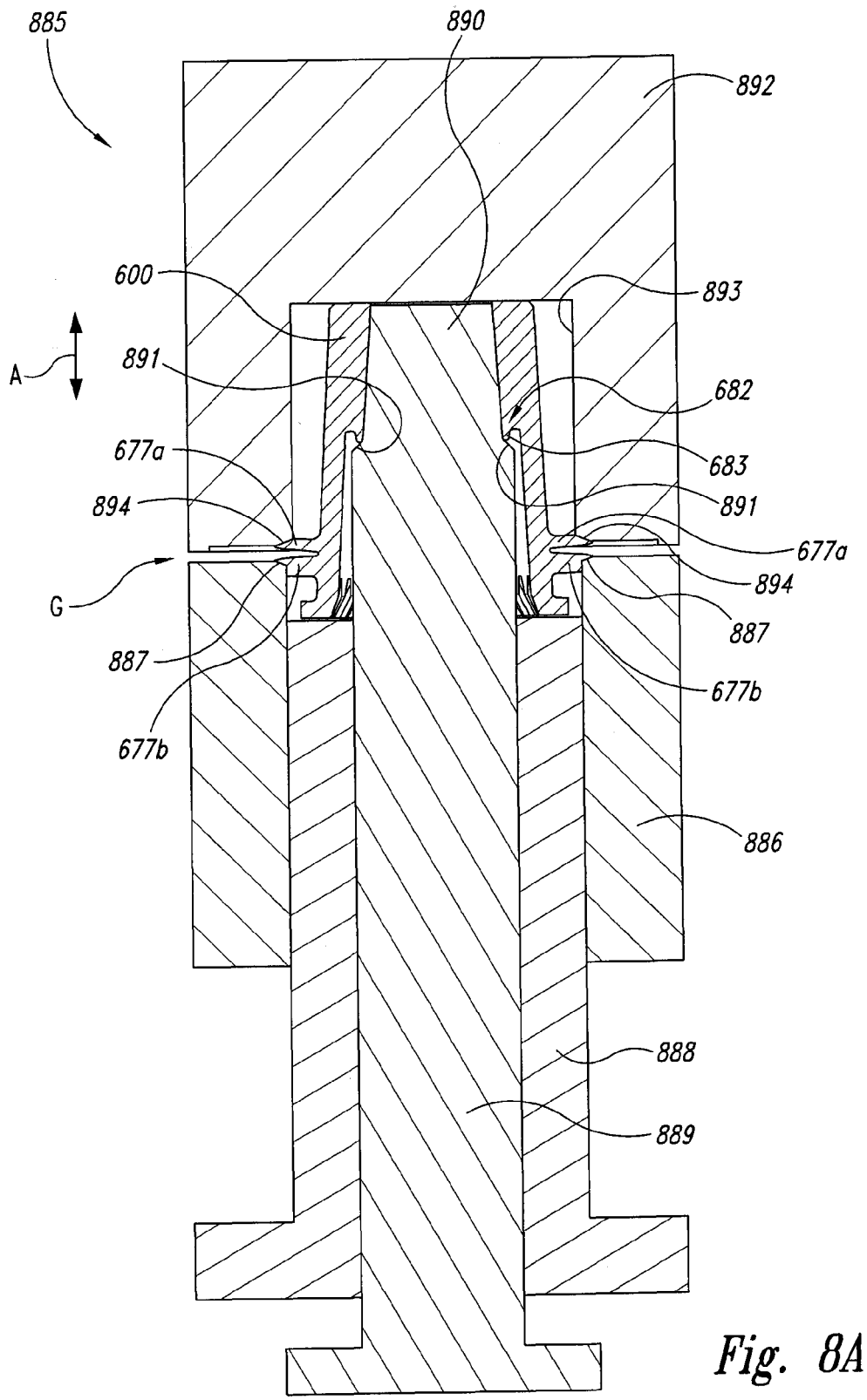
FIG. 8A is a side cross-sectional view of a die assembly configured in accordance with yet another embodiment of the disclosure.
Figure 8B:
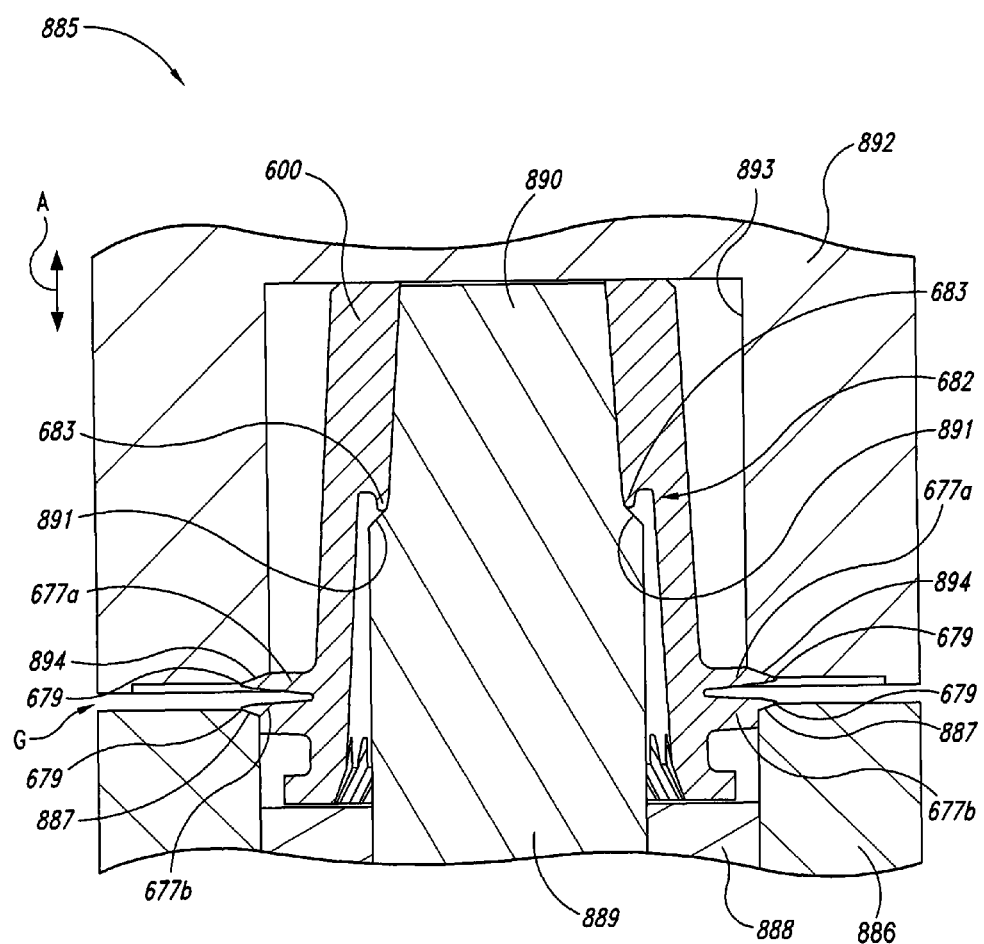
FIG. 8B is an enlarged detail view of a portion of the assembly of FIG. 8A.

FIG. 8A is a cross-sectional side view of an assembly 885 for forming a battery part in accordance with an embodiment of the disclosure. FIG. 8B is an enlarged detail view of a portion of the assembly 885 of FIG. 8A. Referring to FIGS. 8A and 8B together, in the illustrated embodiment the assembly 885 is a forming die assembly that is used to crimp or deform the engaging features of the battery part 600 described above with reference to FIGS. 6A-7. In FIGS. 8A and 8B, the battery part 600 is shown in the assembly 885 at the stage of FIGS. 6C and 6D before the engaging members 677 are crimped or deformed. The assembly 885 includes a first block or die member 892 and a second block or die member 886. The first and second die members 892 and 886 are movable relative to each another in the directions indicated by arrow A (e.g., towards and away from each other). The first die member 892 includes a cavity 893 that has a first shaping or deforming surface 894. The second die member 886 has a corresponding second shaping or deforming surface 887. The first deforming surface 894 is aligned with the second deforming surface 887. Moreover, the first and second deforming surfaces 894 and 887 are also aligned with the corresponding edge portions 679 of the first and second sealing members 677a and 677b of the battery part 600. As shown in FIGS. 8A and 8B, at this stage of the processing, the first die member 892 is spaced apart from the second die member 886 by a gap G.

The second die member 886 receives a sleeve 888, which in turn receives a plunger or core 889. The core 889 includes an end portion 890 having a third crimping or deforming surface 891. The third deforming surface 891 can be a tapered or angled shoulder of the end portion 890 of the core 889 to crimp or deform the extension 683 of the second engaging portion 682. The core 889 is movable relative to the first and second die members 892 and 886 in the directions indicated by arrow A.

To form the crimped or deformed features of the battery part 600, the battery part 600 is positioned in the assembly 885 as shown in FIGS. 8A and 8B. More specifically, the battery part 600 is positioned between the first die member 892 the second die member 886, with the end portion 890 of the core 889 inserted into the battery part 600. At this stage in the manufacturing, the first deforming surface 894 of the first die member 892 contacts the first sealing member 677a, the second deforming surface 887 of the second die member 886 contacts the second sealing member 677b, and the third deforming surface 891 of the core 889 contacts the extension 683.

Figure 8C:
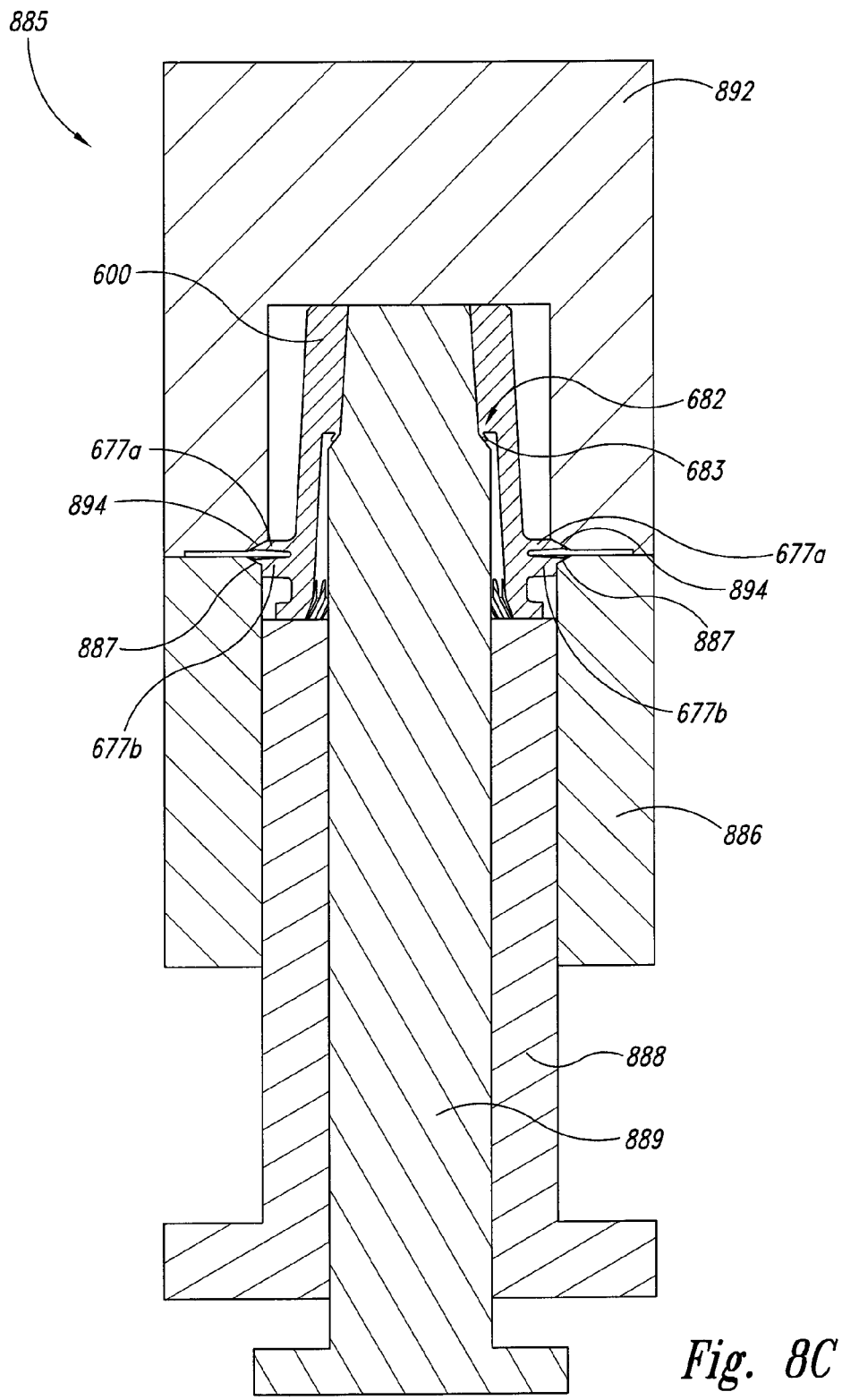
FIG. 8C is a side cross-sectional view of the assembly of FIG. 8A at a different stage of a forming process.
Figure 8D:
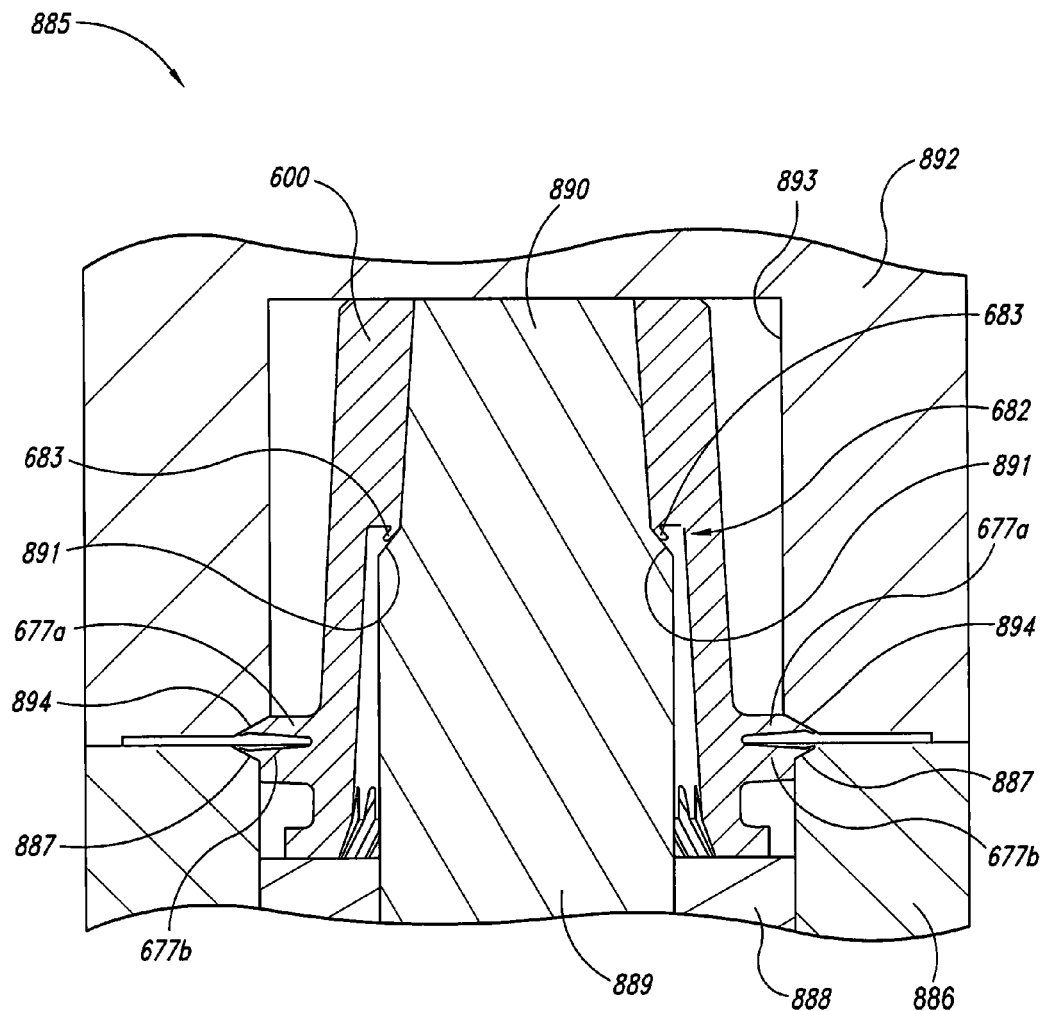
FIG. 8D is an enlarged detail view of a portion of the assembly of FIG. 8C.

In one embodiment, when the first die member 892 drives the battery part 600 towards the second die member 886 and the core 889, the first deforming surface 894 deforms the edge portion 679 of the first sealing member 677a and the second deforming surface 887 deforms the edge portion 679 of the second sealing member 677b (as shown in FIGS. 8C and 8D). More specifically, when the first die member 892 moves towards the second die member 886, the first and second deforming surfaces 894 and 887 form an annular groove around the battery part 600 that deflects or otherwise deforms (e.g., plastically deforms) the edge portions 679 of the sealing members 677 towards one another. Moreover, the third deforming surface 891 of the core 889 simultaneously deforms the extension 683. More specifically, as the core 889 is further inserted into the battery part 600, the extension 683 deflects or otherwise deforms (e.g., plastically) along the tapered third deforming surface 891. As will be appreciated by those of ordinary skill in the art, the first die member 892, the second die member 886, the sleeve 888, and the core 889 can all be independently movable relative to one another to crimp or deform the features of the battery part 600 (e.g., the core 889, sleeve 888, and/or second die member 886 can independently move towards the first die member 892). Moreover, as will also be appreciated by those of ordinary skill in the art, any of the components of the assembly 885 can be sized and/or interchanged with other components according to the size and specification of the battery part 600.

FIG. 8C is a cross-sectional side view of an assembly 885 after the assembly 885 has crimped or deformed the sealing members 677 and the extension 683 of the battery part 600. FIG. 8D is an enlarged detail view of a portion of the assembly 885 of FIG. 8C. Referring to FIGS. 8C and 8D together, with the movable components of the assembly 885 in the illustrated closed or deforming position (e.g., with the first die member 892 contacting the second die member 886 and/or the core 889), the sealing members 677 and the extension 683 have been crimped or deformed to provide the sealing and engaging features of these components as described above with reference to FIGS. 6A-7.

The various battery parts described above can be manufactured from lead, lead alloys, and/or other suitable materials known to those of ordinary skill in the art. In addition, these parts can be manufactured by any suitable manufacturing method such as die casting, cold forming, die forming, die bending, roll forming, stamping, forging, machining, etc. For example, in one embodiment, the battery parts described herein can be formed by cold-forming with a segmented mold, such as a segmented mold having two segments. In addition, various embodiments of the battery parts described herein can be formed in accordance with methods disclosed in, and can include features at least generally similar to, those disclosed in U.S. Pat. No. 5,349,840, which is incorporated herein in its entirety by reference.

From the foregoing, it will be appreciated that specific embodiments of the disclosure have been described herein for purposes of illustration, but that various modifications may be made without deviating from the spirit and scope of the various embodiments of the disclosure. For example, although many of the Figures described above illustrate battery parts having cylindrical portions (e.g., cylindrical lug portions, base portions, through-holes, etc.), in other battery parts configured in accordance with the present disclosure these portions can have one or more flat sides and/or other non-cylindrical surfaces. Further, while various advantages associated with certain embodiments of the disclosure have been described above in the context of those embodiments, other embodiments may also exhibit such advantages, and not all embodiments need necessarily exhibit such advantages to fall within the scope of the disclosure.

We claim:

1. A battery part configured to provide an external connection for a battery, the battery part comprising:
   a body having a lug portion extending from a base portion, wherein the base portion is configured to be a least partially embedded in battery container material, the base portion including:
      a first torque resisting flange extending away from the base portion; and
      a second torque resisting flange spaced apart from the first torque resisting flange, wherein the second torque resisting flange extends away from the base portion and includes a plurality of recesses formed therein, and wherein the second torque resisting flange further comprises an engaging portion including
         a first engaging projection extending radially outwardly from the base portion, the first engaging projection having a first end portion;
         a second engaging projection opposite the first engaging potion projection and extending radially outwardly from the base portion, the second engaging projection having a second end portion, wherein the first and second end portions are at least partially deflected towards one another; and
         a groove extending peripherally around the base portion between the first and second engaging projections.

2. The battery part of claim 1 wherein individual recesses extend in generally parallel directions with respect to each another.

3. The battery part of claim 1 wherein individual recesses extend at least partially through the second torque resisting flange in a direction generally perpendicular to a longitudinal axis of the body.

4. The battery part of claim 1 wherein the recesses form a serrated edge portion of the second torque resisting flange facing the first torque resisting flange.

5. The battery part of claim 1 wherein the second torque resisting flange includes a lateral wall portion facing the first torque resisting flange and extending away from the base portion, and a sidewall portion extending generally perpendicularly from the lateral wall portion, and wherein individual recesses extend at least partially through each of the lateral wall portion and the sidewall portion.

6. The battery part of claim 1 wherein individual recesses have a beveled sidewall portion extending into the second torque resisting flange.

7. The battery part of claim 1 wherein each of the first and second torque resisting flanges has a polygonal shape with a plurality of generally flat sides.

8. The battery part of claim 1 wherein the base portion further comprises at least one sealing portion positioned between the first and second torque resisting flanges.

9. The battery part of claim 8 wherein the at least one sealing portion includes an annular channel extending around the base portion.

10. The battery part of claim 1, further comprising a through-hole extending longitudinally through the body, the through-hole including:
    a first hole portion extending from the base portion partially into the lug portion; and
    a second hole portion extending from the first hole portion through a remainder of the lug portion;
    wherein the first hole portion is radially offset form the second hole portion.

11. The battery part of claim 10 wherein the body further comprises a stepped shoulder portion at an interface between the first and second hole portions, and wherein the first hole portion is configured to at least partially receive the battery container material up to the shoulder portion.

12. The battery part of claim 1, further comprising a plurality of gripping features extending at least partially around an inner peripheral portion of the base portion.

13. The battery part of claim 12 wherein the gripping features include a plurality of grooves extending partially into the base portion and forming a generally knurled surface around the inner peripheral portion.

14. A battery part configured to be at least partially embedded in battery container material, the battery part comprising:
    a lug portion configured to be adjacent to the battery container material; and
    a base portion extending from the lug portion and configured to be at least partially embedded in the battery container material, wherein the base portion includes:
       an engaging portion having—
          a first engaging projection extending radially outwardly from the base portion, the first engaging projection having a first end portion;
          a second engaging projection opposite the first engaging portion and extending radially outwardly from the base portion, the second engaging projection having a second end portion, wherein the first and second end portions are at least partially deformed towards one another; and
          a groove extending peripherally around the base portion between the first and second engaging projections;
       a first torque resisting flange extending away from the base portion; and
       a second torque resisting flange spaced apart from the first torque resisting flange, wherein the second torque resisting flange extends away from the base portion, and wherein the engaging portion comprises a bifurcated portion of the second torque resisting flange.

15. The battery part of claim 14 wherein the first end portion is spaced apart from the second end portion by a first distance that is less than a second distance spanning the groove between the first and second engaging projections.

16. The battery part of claim 14 wherein the groove at least partially defines a first interior surface of the first engaging projection and a second interior surface of the second engaging projection, wherein each of the first and second interior surfaces has curved non-planar section.

17. The battery part of claim 14 wherein the first engaging projection includes a generally planar lateral surface extending from the base portion, wherein the lateral surface is configured to be generally coplanar with the battery container material.

18. The battery part of claim 14 wherein the first and second engaging projections are configured to at least partially retain the battery container material in the groove.

19. The battery part of claim 14 wherein the first torque resisting flange includes a plurality of notches formed therein, wherein individual notches extend in generally parallel directions with reference to each another.

20. The battery part of claim 14, further comprising:
   a through hole extending through the base portion and the lug portion, wherein the through hole at least partially defines an inner surface of the battery terminal; and
   a plurality of gripping features forming a generally knurled surface around at least a portion of the inner surface of the base portion.

21. The battery part of claim 20 wherein the gripping features comprise a plurality of alternating grooves and protrusions positioned at least partially around the inner surface of the base portion.

22. The battery part of claim 20 wherein the through hole comprises:
   a first cavity portion extending through the base portion and through at least a portion of the lug portion, the first cavity portion having a first cross-sectional dimension; and
   a second cavity portion extending from the first cavity portion through a remainder of the lug portion, the second cavity portion having a second cross-sectional dimension less that the first cross-sectional dimension.

23. The battery part of claim 22, further comprising:
   a stepped shoulder portion at an interface between the first and second cavity portions; and
   a gripping extension projecting from the shoulder portion into the first cavity portion, wherein the gripping extension is at least partially deflected towards the interior surface of the first cavity.

* * * * *